(12) United States Patent  
Palanisamy et al.

(10) Patent No.: US 9,171,096 B2  
(45) Date of Patent: Oct. 27, 2015

(54) SYSTEM AND METHOD FOR HARVESTING METADATA INTO A SERVICE METADATA REPOSITORY

(75) Inventors: Muthukumar S. Palanisamy, Sunnyvale, CA (US); David E. DiFranco, St. Louis, MO (US); Sharon Y. Fay, Bay Village, OH (US); David S. Keyes, Clinton, OH (US); Robert W. Scanlon, Des Peres, MO (US); Adam J. Wallace, Mentor, OH (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 518 days.

(21) Appl. No.: 12/605,265

(22) Filed: Oct. 23, 2009

(65) Prior Publication Data

US 2010/0161629 A1   Jun. 24, 2010

Related U.S. Application Data

(60) Provisional application No. 61/108,445, filed on Oct. 24, 2008.

(51) Int. Cl.  
  *G06F 17/30* (2006.01)
(52) U.S. Cl.  
  CPC ............... *G06F 17/30893* (2013.01)
(58) Field of Classification Search  
  CPC .................................................. G06F 17/30893  
  USPC ..................... 707/705, 736, 756, 769  
  See application file for complete search history.

(56) References Cited

U.S. PATENT DOCUMENTS

| | | | | |
|---|---|---|---|---|
| 7,428,582 | B2* | 9/2008 | Bean et al. | 709/218 |
| 7,698,569 | B2* | 4/2010 | Beiter et al. | 713/189 |
| 7,707,157 | B1* | 4/2010 | Shen | 707/999.102 |
| 7,725,482 | B2* | 5/2010 | Smith et al. | 707/759 |
| 7,801,894 | B1* | 9/2010 | Bone et al. | 707/737 |
| 2002/0038296 | A1* | 3/2002 | Margolus et al. | 707/1 |
| 2004/0015564 | A1* | 1/2004 | Williams | 709/219 |
| 2005/0021348 | A1* | 1/2005 | Chan et al. | 705/1 |
| 2005/0210441 | A1* | 9/2005 | Tarr et al. | 717/101 |
| 2006/0130125 | A1* | 6/2006 | Beiter et al. | 726/4 |
| 2007/0168479 | A1* | 7/2007 | Bean et al. | 709/223 |
| 2007/0245252 | A1* | 10/2007 | Zaremski et al. | 715/762 |
| 2007/0255717 | A1* | 11/2007 | Baikov et al. | 707/10 |

(Continued)

OTHER PUBLICATIONS

McKee, Barbara et al, "Introducing IBM WebSphere Service Registry and Repository, Part 2," Sep. 29, 2006, IBM, http://www.ibm.com/developerworks/websphere/library/techarticles/0609_mckee2/0609_mckee2.html.*

(Continued)

*Primary Examiner* — James Trujillo  
*Assistant Examiner* — Hubert Cheung  
(74) *Attorney, Agent, or Firm* — Tucker Ellis LLP

(57) ABSTRACT

Business Process Execution Language (BPEL) engines and Enterprise Service Buses (ESBs) often connect to adapters to integrate backend packaged applications with a process flow by invoking web services using Java Connector Architecture (JCA) and Simple Object Access Protocol (SOAP) bindings. The Web Service Description Language (WSDL) files for the web services that interact with the adapters can be introspected to harvest adapter integration and transformation information into a service metadata repository. This permits dependency and impact analysis to extend from services to adapters and transformations.

20 Claims, 21 Drawing Sheets

(56) References Cited

U.S. PATENT DOCUMENTS

| | | |
|---|---|---|
| 2007/0266377 A1* | 11/2007 | Ivanov .......................... 717/136 |
| 2007/0282879 A1* | 12/2007 | Degenkolb et al. ........... 707/101 |
| 2009/0064205 A1* | 3/2009 | Fay et al. ...................... 719/329 |
| 2009/0112655 A1* | 4/2009 | Stuhec et al. .................... 705/7 |
| 2009/0204612 A1* | 8/2009 | Keshavarz-Nia et al. ......... 707/6 |
| 2010/0082565 A1* | 4/2010 | Breeds et al. ................. 707/705 |

OTHER PUBLICATIONS

McKee et al., "Introducing IBM WebSphere Service Registry and Repository", Part 2, Sep. 29, 2006, IBM, pp. 1-7.*

* cited by examiner

```
<adapter name="File Adapter" jcaSpecBinding="oracle.tip.adapter.file.outbound.FileInteractionSpec"
<adapter name="File Adapter" jcaSpecBinding="oracle.tip.adapter.file.inbound.FileActivationSpec" na <adapterAsset name="File Adapter">
    <property name="Description" value="A significant number of enterprise data in use today are dis
    rapidly integrates information stored in a variety of formats to promote global view of the busir
    <property name="Read and Publish Files" value="The Adapter is capable of polling local versus rea
    and publish the file contents as XML. The Adapter is also capable of receiving a synchronous requ
    parsed contents of the file as a XML message. Format and Write Files. The Adapter is also capabl
    content into output files of different data formats. high availability and scalability."/>
```

FIG. 22

```
<adapter name="Siebel Adapter" jcaSpecBinding="" namespace="http://siebel.com/fmw"/>

<adapterAsset name="Oracle Applications Adapter">
    <property name="Description" value="The Adapter for Oracle Applications provides c
    asynchronous connectivity to the Oracle Applications. The Oracle Applications Adep
    Applications with the rest of your extended enterprise."/>
</adapterAsset>
```

FIG. 23

SYSTEM AND METHOD FOR HARVESTING METADATA INTO A SERVICE METADATA REPOSITORY

CLAIM OF PRIORITY

The present application claims the benefit of priority under 35 U.S.C. §119(e) to U.S. Provisional Patent Application No. 61/108,445 entitled "SYSTEM AND METHOD FOR HARVESTING METADATA INTO A SERVICE METADATA REPOSITORY," filed on Oct. 24, 2008, which application is incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The invention is related to Service-Oriented Architecture in general, and particularly to a service metadata repository.

BACKGROUND

Service-Oriented Architecture (SOA) is based on the deconstruction of yesterday's monolithic applications and information technology infrastructure into a matrix of discrete, standards-based, network-accessible services. The process of transformation requires the organization, identification, and repurposing of applications and business processes of the existing information technology infrastructure. The transformation to SOA begins with an analysis of the IT infrastructure to identify applications, business processes, and other software assets that become services, or otherwise support the SOA.

A Service-Oriented Architecture implements the delivery of software services to clients over a network. SOA differentiates itself from other systems by these features: system resources are made available as loosely-coupled, independent services; services are made available through platform-independent and programming language-independent interfaces that are defined in a standardized way; and services are available both to clients and other services.

SUMMARY

Business Process Execution Language (BPEL) engines and Enterprise Service Buses (ESBs) often connect to adapters to integrate backend packaged applications with a process flow by invoking web services using Java Connector Architecture (JCA) and Simple Object Access Protocol (SOAP) bindings. The Web Service Description Language (WSDL) files for the web services that interact with the adapters can be introspected to harvest adapter integration and transformation information into a service metadata repository. This permits dependency and impact analysis to extend from services to adapters and transformations.

Successfully introspecting WSDL metadata into a service metadata repository resulted in a number of innovations including Semantic Software File Identification (SFID), resolving issues with QName-based correlation of abstract assets, and Ant task-based introspection (where introspection is performed via a scripting tool to harvest software assets from local design environment and global build contexts). A further advantage of the solution is delivery of extensible asset type systems and canonical data by delivering solution pack-like models to UDDI with a service metadata repository, including delivering actual canonical assets (not just types) in the solution pack.

BRIEF DESCRIPTION OF THE DRAWINGS

FIG. 22 shows an example, in accordance with an embodiment.

FIG. 23 shows an example, in accordance with an embodiment.

DETAILED DESCRIPTION

Figure 1:
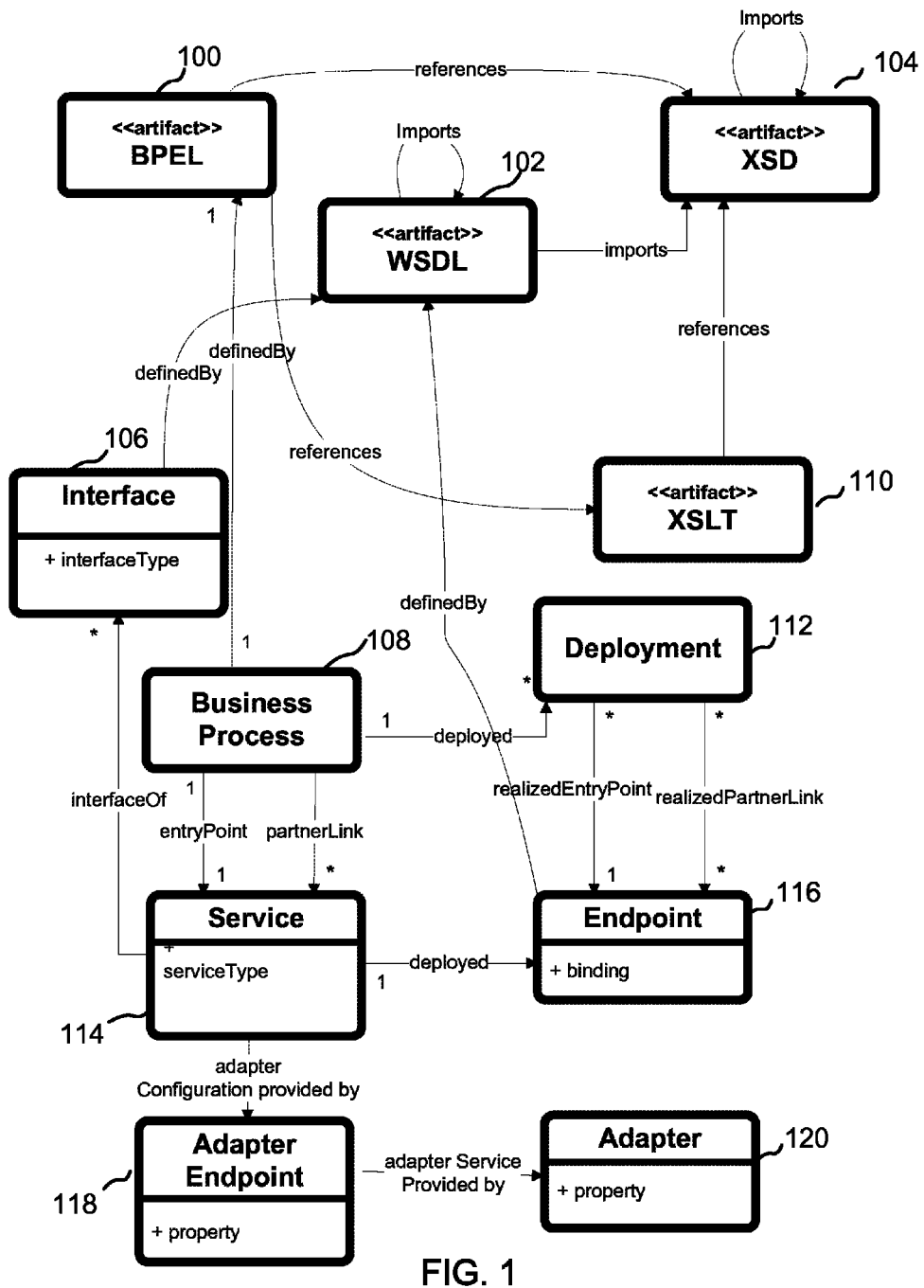
FIG. 1 shows a class diagram, in accordance with an embodiment.

Service-Oriented Architecture (SOA) is a new approach to information technology that connects people, process, and technology in a dynamic, distributed environment. Although SOA provides the agility required to innovate and compete in today's economy, it also increases system complexity. To mitigate this risk, organizations control and track information technology investments to ensure alignment with corporate objectives. A service metadata repository enables SOA governance that provides comprehensive insight into the business impact of SOA. A service metadata repository can enable SOA governance to span the SOA lifecycle and unite resources from across divisions and geographies in a collaborative holistic approach to corporate decision-making and compliance by providing the automated exchange of metadata and service information among service consumers, providers, policy decision points, and other governance tools.

A service metadata repository provides role-based visibility into all SOA assets, regardless of source, through a centralized repository for business processes, services, applications, components, models, frameworks, policies, and data services. Visibility into assets under development minimizes redundancy and promotes service collaboration and reuse. A service metadata repository could also graphically display and navigate asset-to-asset and asset-to-project relationships and interdependencies to simplify impact analysis and ensure business alignment by enabling users to organize and link SOA assets to associated business processes.

Metadata is data about data, or more specifically, information about the content of the data. Service metadata is information about the services in an SOA. Service producers use service metadata to describe what service consumers need to know to interact with the service, service producers, and service providers. Service metadata is stored in a metadata repository by service producers and then accessed by service consumers. A metadata repository provides visibility into the portfolio of assets, the traceability of the assets within that portfolio, the relationships and interdependencies that connect the assets to each other, the policies that govern use of the assets, and the projects that produce the assets and consume the assets.

Service metadata is data or other information that is produced by a service producer and used by a service consumer. Service producers and service consumers access the service metadata which can be provided in the form of files on a file system or stored in a database. Service artifacts include data service (.ds) files; XML Schema files; or WSDL files. The service metadata provides useful information about a service. Examples include a name, version, last modified timestamp, URL, or other properties. An asset is a representation of service metadata, or a part of service metadata in the service metadata repository. Service metadata assets can be stored in a service metadata repository. The data service files, XML Schema files, and WSDL files themselves can be stored in the repository, but are assumed to be stored external to the repository, for example in a source configuration management (SCM) system.

It is not sufficient to simply store design time service metadata assets in a service metadata repository in order to allow reuse of service metadata assets and to promote SOA governance. There are additional problems with service metadata reuse. Determining whether the service assets have a sufficient quality is one problem. A further problem is how to ensure that the right people and the right business processes receive or have access to the right service metadata assets and whether the service metadata assets have been approved by the proper authorities.

Previously, service metadata repositories relied upon the skill of human users (administrators or registrars) to review the asset for quality and to determine that the right people see the right assets. The human user reviewed the asset manually, assigned the asset to a domain expert for review of the content, and after approval by a domain expert, the asset was moved to registered status. Users could then access the registered asset. In some cases, half a dozen different domain experts might be involved in the approval decisions at different stages. For example, an architect might need to approve a WSDL asset before a subsequent approval by a documentation expert. This potentially results in a large number of manual steps in the review and approval process for service metadata assets that must be performed by the administrator or registrar.

What is needed is a way to automatically introspect service metadata from artifacts into a service metadata repository. Furthermore, what is needed is the ability to automatically introspect metadata from adapters into a service metadata repository to support the visibility, impact analysis, and reliability use cases as applied to adapters. Introspecting adapter metadata allows dependencies between the service metadata artifacts and the adapter to be analyzed.

FIG. 1 shows a class diagram in accordance with an embodiment. BPEL <<artifact>> 100 represents an entity that contains Business Process Execution Language (BPEL) metadata. WSDL <artifact> 102 represents an entity that contains Web Service Description Language (WSDL) metadata. XSD <<artifact>> 104 represents an entity that contains XML Schema Definition (XSD) metadata. XSLT <<artifact>> 110 represents an entity that contains Extensible Style-sheet Language Transformation (XSLT) metadata. Business process 108 represents a high level business process. Service 114 represents a concrete service that is an implementation of an interface. Interface 106 represents an abstract interface that will be implemented by a service. Endpoint 116 represents a concrete access protocol and binding to access a service. An endpoint is defined by a WSDL artifact. An endpoint is an instance of a deployed service. Deployment 112 represents a deployed instance of a business process. Adapter Endpoint 118 is a deployed adapter service provided by Adapter 120.

Figure 2:
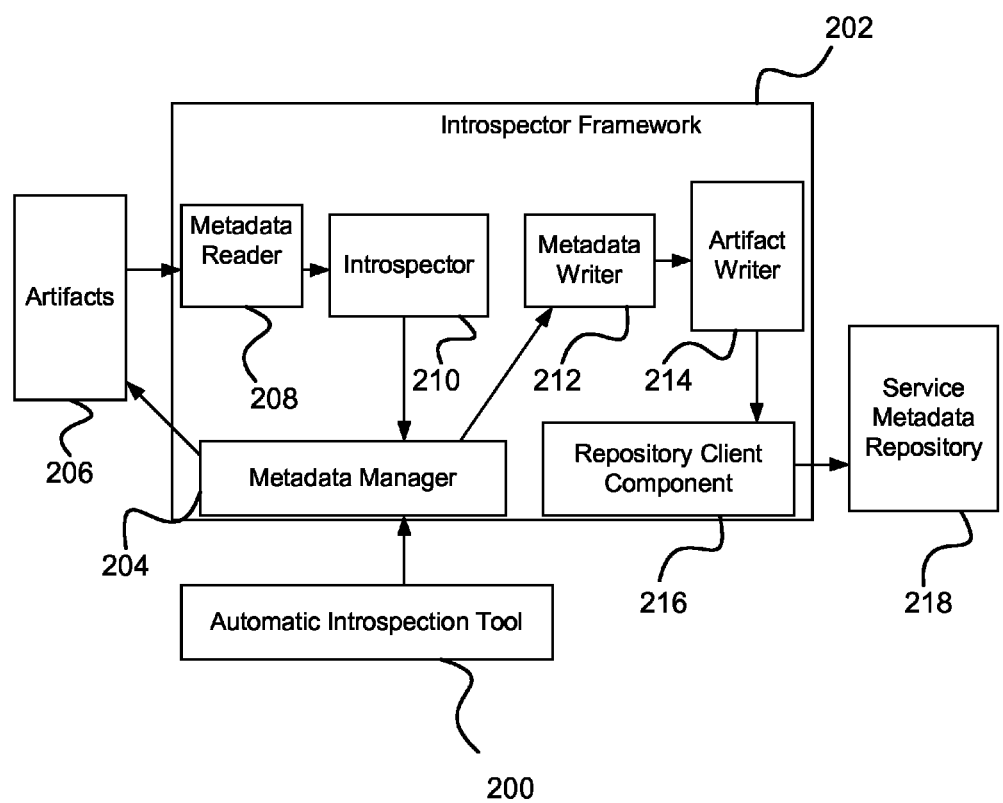
FIG. 2 shows the architecture for a system, in accordance with an embodiment.

In accordance with an embodiment, the system architecture for one embodiment is shown in FIG. 2. An automatic introspection tool 200 sends a request to a metadata manager 204 that belongs to introspector framework 202. In accordance with an embodiment, automatic introspection tool is an ant task, a command line utility, or an integrated development environment such as Oracle JDeveloper. The metadata manager 204 identifies one or more artifacts 206 to be read by the metadata reader 208. In one embodiment, the artifacts are WSDL, BPEL, XSD, or XSLT. In one embodiment, there are specific types of metadata readers for different types of metadata sources (file system, database, etc.). The introspector 210 builds a list of entities from the metadata examined by the metadata reader 208. In one embodiment, there is a specific introspector datatype for each type of metadata (BPEL, WSDL, XSD, etc.). The metadata manager 204 receives the list of entities, and forwards the list of entities to the metadata writer 212. The metadata writer 212 then begins a transaction and transforms each artifact entity into a canonical form. The Artifact writer 214 then creates non-artifact entities. A repository client component 216 then creates a FingerPrint of the service metadata asset. The service metadata asset is then stored in the service metadata repository 218 if it does not already exist in the service metadata repository.

Figure 3:
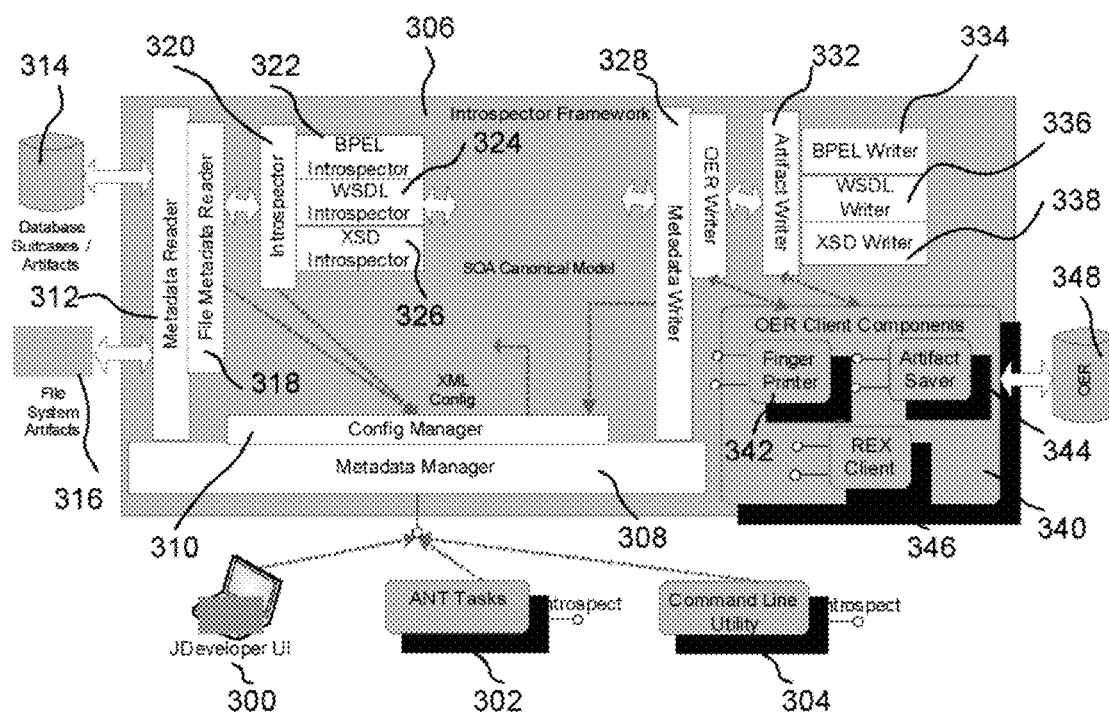
FIG. 3 shows the architecture for a system, in accordance with an embodiment.

In accordance with an embodiment, the system architecture for one embodiment is shown in FIG. 3. An integrated development environment such as JDeveloper user's interface 300, an ANT task 302, or a command line utility 304 sends a request to a metadata manager 308 that belongs to introspector framework 306. The metadata manager 308 identifies one or more database/suitcase artifacts 314 or file system artifacts 316 to be read by the metadata reader 312. A specialized FileMetadataReader 318 will read file system artifacts 316. In one embodiment, the artifacts are WSDL, BPEL, XSD, or XSLT. The introspector 320 builds a list of entities from the metadata examined by the metadata reader 312. In one embodiment, there is a specific introspector datatype for each type of metadata (BPEL Introspector 322, WSDL Introspector 324, XSD Introspector 326, etc.). The config manager 310 receives the list of entities, and forwards the list of entities to the metadata writer 328. The metadata writer 328 then begins a transaction and transforms each artifact entity into a canonical form. In one embodiment, a service metadata repository writer 330 transforms the artifact entity into a canonical form. In one embodiment, the service metadata repository writer is an OER writer. The Artifact writer 332 then creates non-artifact entities. In one embodiment, there is a specific writer datatype for each type of metadata (BPEL Writer 334, WSDL Writer 336, XSD Introspector 338, etc.). A repository client component 340 then creates a FingerPrint of the service metadata asset. In one embodiment, the service metadata repository client component includes a finger printer 342, an artifact saver 344, and a REX client 346. In one embodiment, the service metadata repository 348 is known as OER, or Oracle Enterprise Repository. The service metadata asset is then stored in the service metadata repository 348 if it does not already exist in the service metadata repository.

Figure 4:
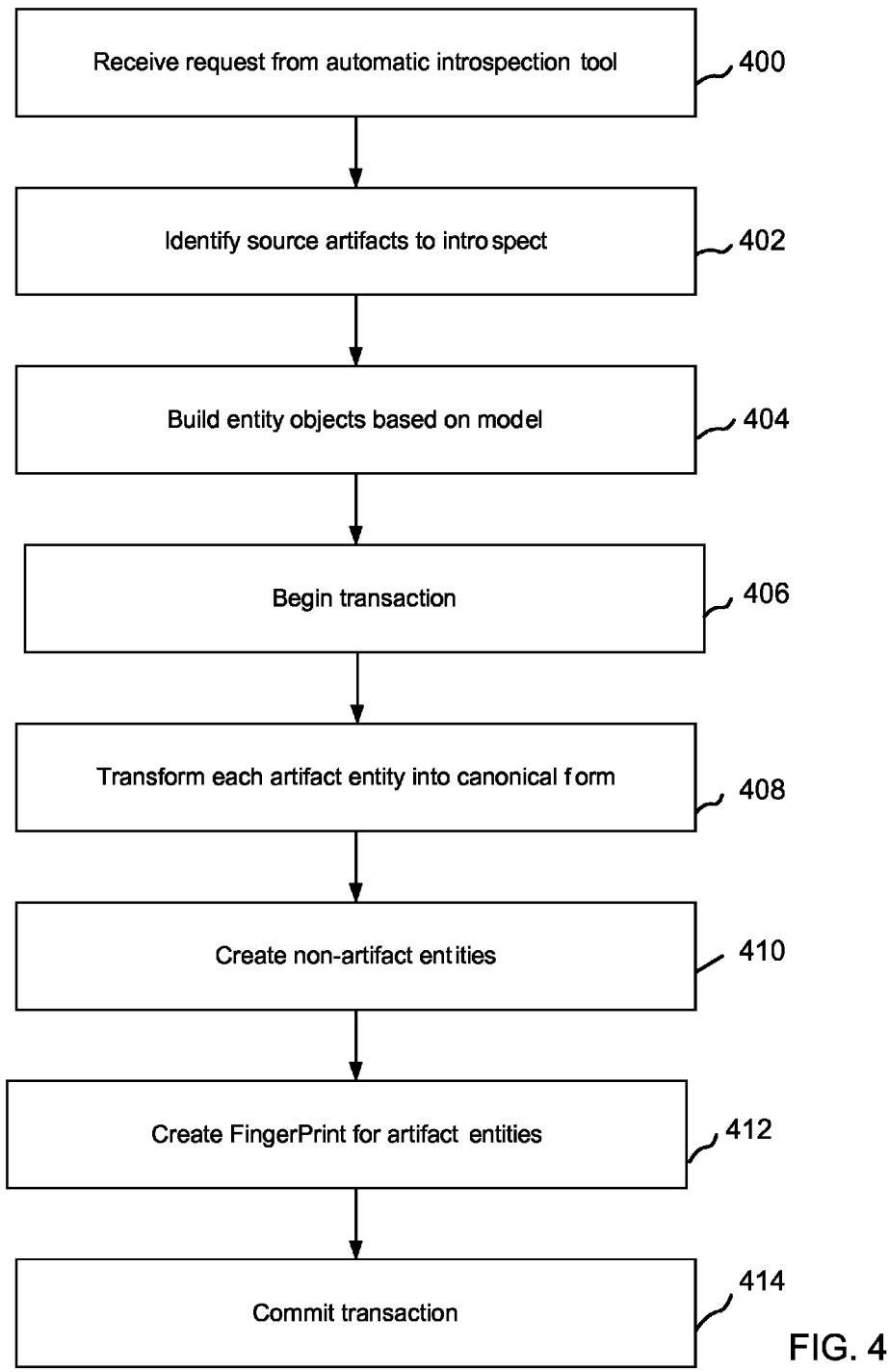
FIG. 4 shows a flowchart for a method, in accordance with an embodiment.

One embodiment is a method for harvesting metadata into a service metadata repository, shown in FIG. 4. In step 400, a request is received from an automatic introspection tool to perform introspection on one or more artifacts. In step 402, one or more source artifacts are identified for performing introspection. In step 404, entity objects are built based on a model. In step 406, a transaction is begun, from this step forward all steps must be successful for the transaction to commit, otherwise the transaction will be rolled back. In step 408, each artifact entity is transformed into a canonical form. In step 410, required non-artifact entities are created. In step 412, FingerPrints are created for each artifact entity to verify that the artifact entity does not already exist in the service metadata repository. In step 414, the transaction is committed, if all steps from 406 to 412 were successful.

Figure 5A:
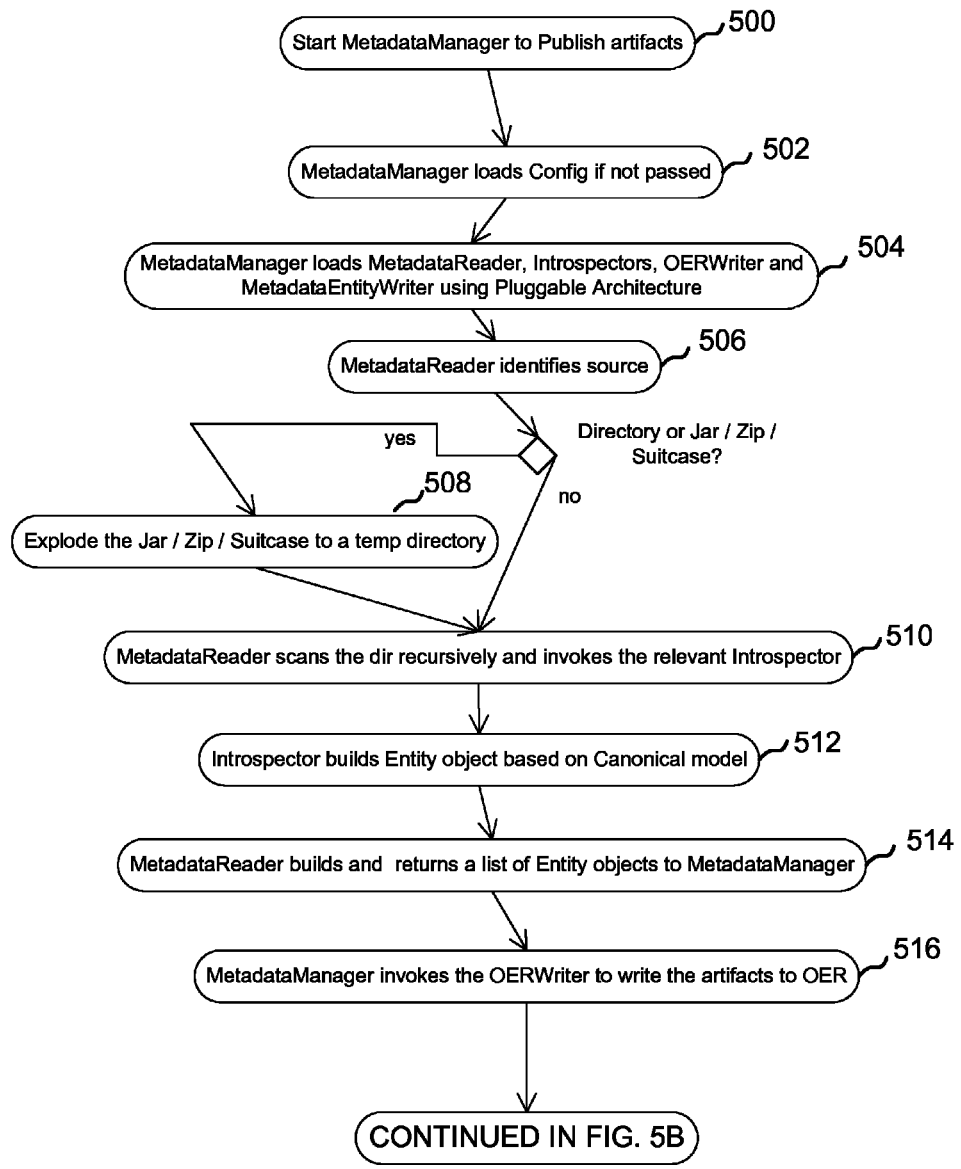
FIGS. 5A and 5B shows a flowchart for a method, in accordance with an embodiment.
Figure 5B:
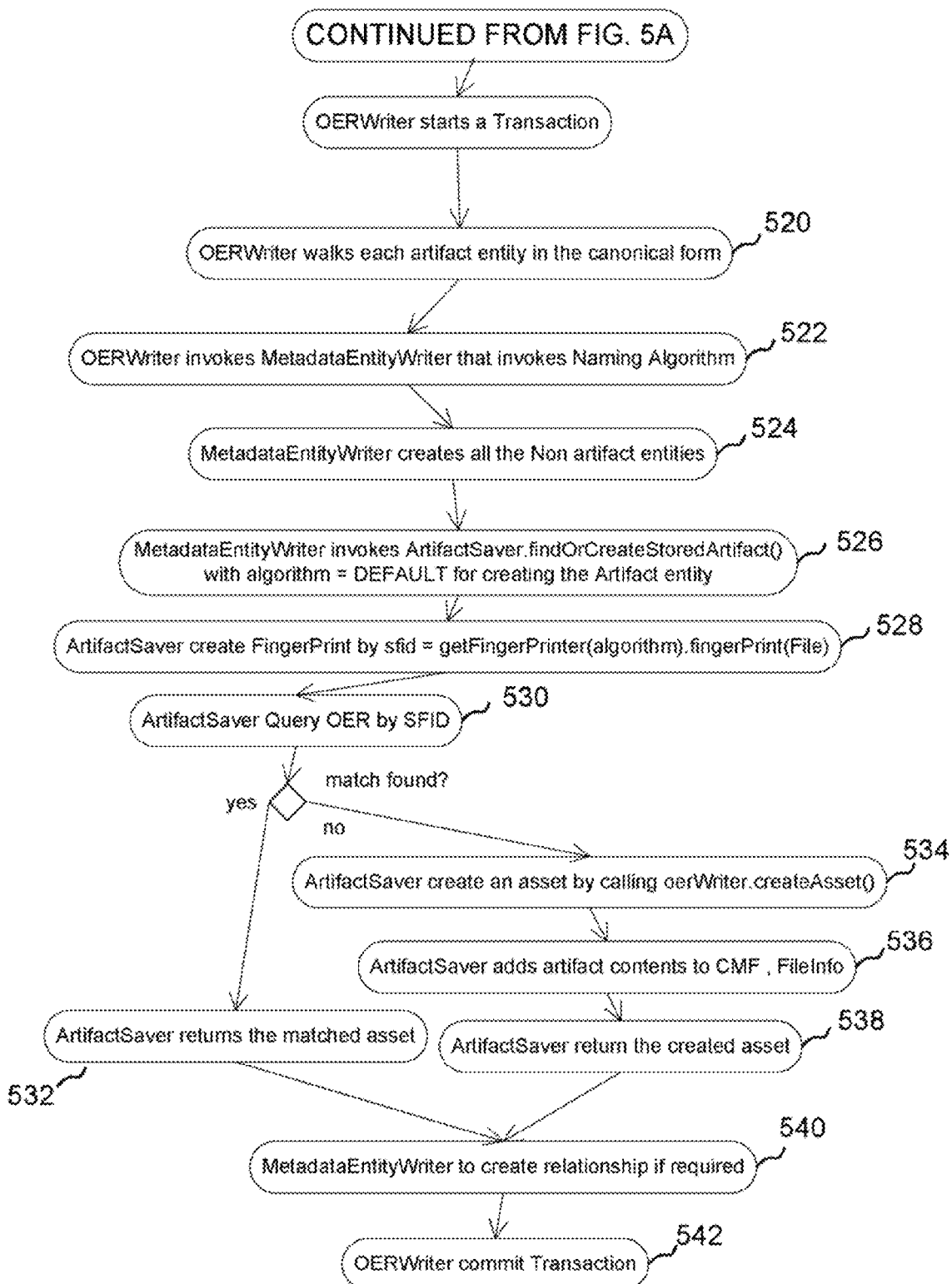

In accordance with a specific embodiment, a method for introspecting metadata is shown in FIG. 5A and FIG. 5B. In step 500, a MetadataManager is started to published artifacts to the service metadata repository. In step 502, the MetadataManager loads configuration information if not passed. In step 504, the MetadataManager loads the MetadataReader, Introspectors, OERWriter, and MetadataEntityWriter using a pluggable architecture. In step 506, one or more source artifacts are identified for performing introspection. If the source is a jar/zip, the jar/zip is exploded into a temporary directory in step 508. In step 510, the MetadataReader scans the directory recursively and invokes the relevant introspector. In step 512, the introspector builds entity objects based on a canonical model. In step 514, the MetadataReader builds and returns a list of entity objects to the MetadataManager. In step 516, the MetadataManager invokes the OERWriter to write the artifacts to the service metadata repository. In one embodiment, the service metadata repository is Oracle Enterprise Repository. In step 518, the OERWriter begins a transaction, from this step forward all steps must be successful for the transaction to commit, otherwise the transaction will be rolled back. In step 520, the OERWriter walks each artifact entity in the canonical form. In step 522, OERWriter invokes MetadataEntityWriter that invokes a naming algorithm. In step 524 MetadataEntityWriter creates all the Non-artifact entities. In step 526, MetadataEntityWriter invokes ArtifactSaver.findOrCreateStoredArtifact( ) with algorithm=DEFAULT for creating the artifact entity. In step 528, ArtifactSaver creates a FingerPrint by sfid. In step 530, the ArtifactSaver queries OER by SFID to determine if the asset already exists in the service metadata repository. If the asset exists, the service metadata repository returns the matched asset in step 532. If the asset does not exist, the ArtifactSaver creates an asset in step 534, adds artifact contents in step 536, and returns the created asset in step 538. In step 540, MetadataEntityWriter creates a relationship if required. In step 542, OERWriter commits the transaction if all steps from 518 to 542 were successful (and either step 532 or steps 534-538 were executed).

Figure 6A:
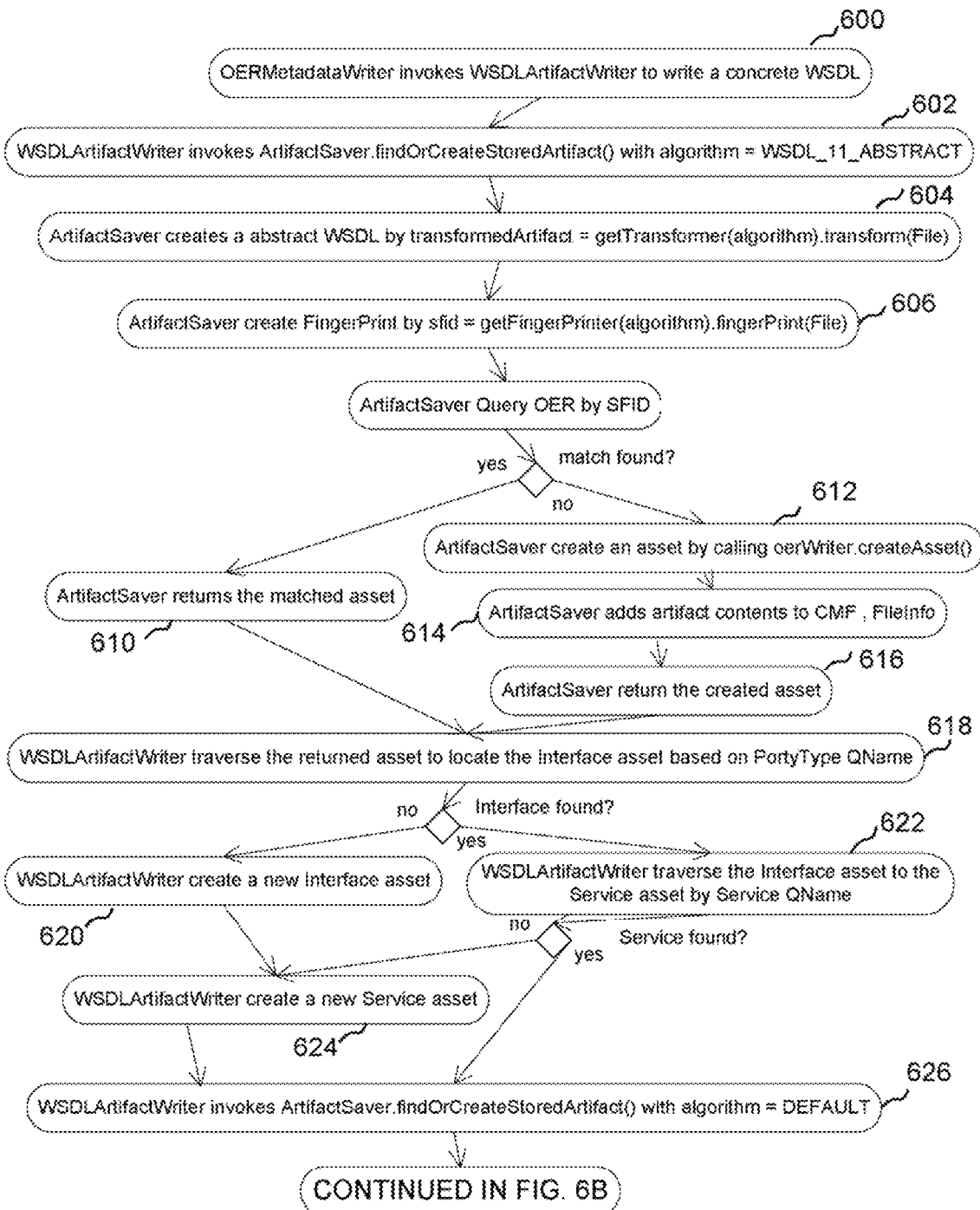
FIGS. 6A and 6B shows a flowchart for a method, in accordance with an embodiment.
Figure 6B:
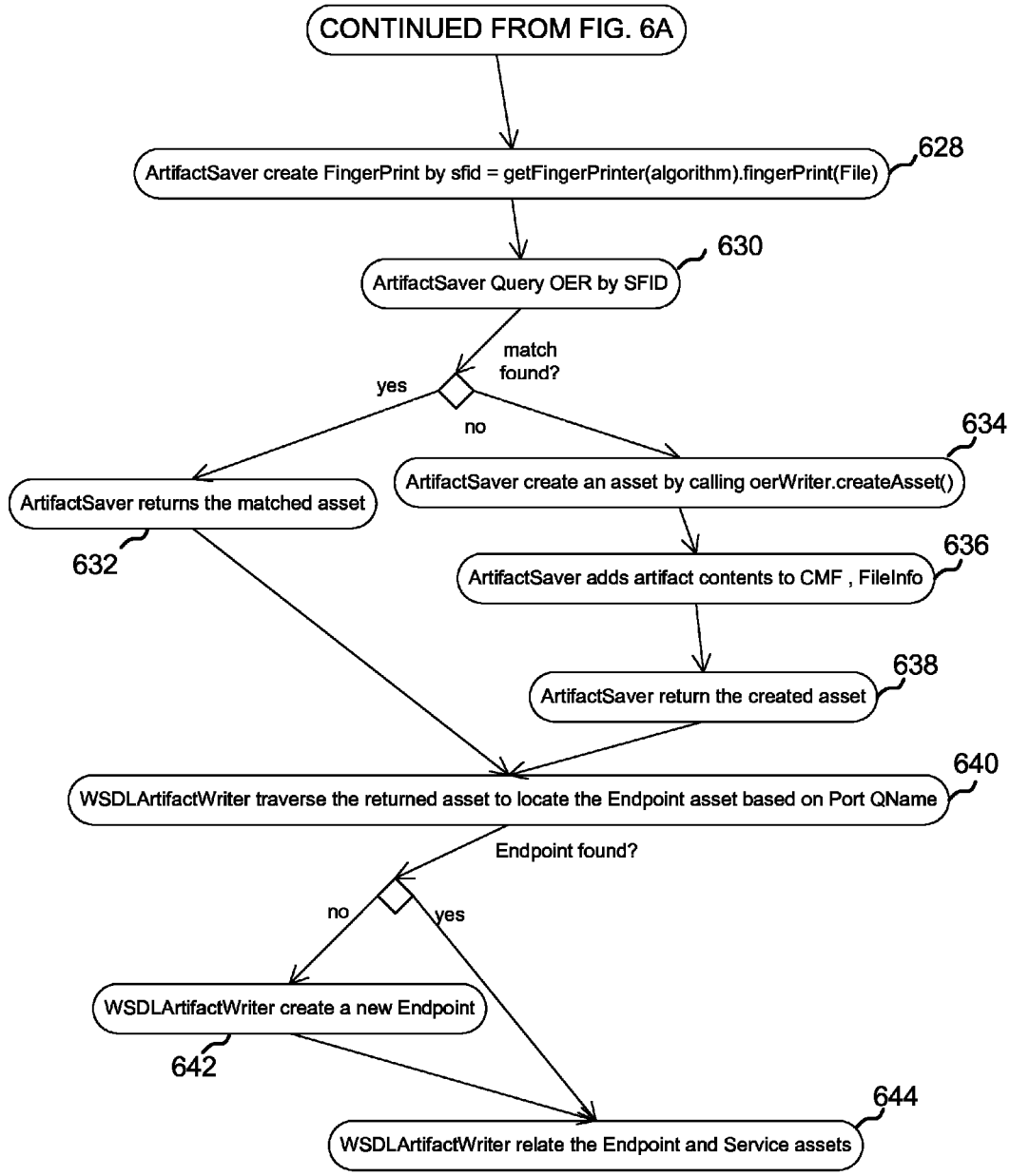

In accordance with a specific embodiment, a method for introspecting WSDL is shown in FIG. 6A and FIG. 6B. In step 600, OERMetadataWriter invokes WSDLArtifactWriter to write a concrete WSDL. In step 602, WSDLArtifactWriter invokes ArtifactSaver.findOrCreateStoredArtifact( ). In step 604, ArtifactSaver creates an abstract WSDL. In step 606, ArtifactSaver creates a FingerPrint by SFID. In step 608, ArtifactSaver queries the service metadata repository by SFID. If the matched asset is found in the service metadata repository, the ArtifactSaver returns the matched asset in step 610. Otherwise, in step 612 an asset is created, in step 614 artifact contents are added to the asset, and in step 616 the created asset is returned. In step 618, WSDLArtifactWriter traverses the returned asset to locate an interface asset based on port type or qualified name. If an interface is not found, a new interface is created in step 620. If an interface is found, the interface is traversed in step 622 to find a service asset by service qualified name. If the service qualified name was not found or the interface was not found, a new service asset is created in step 624. Then the WSDLArtifactWriter invokes ArtifactSaver.findOrCreateStoredArtifact( ) in step 626. The ArtifactSaver then creates a FingerPrint by SFID in step 628. In step 630, the ArtifactSaver queries OER by SFID to determine if the asset already exists in the service metadata repository. If the asset exists, the service metadata repository returns the matched asset in step 632. If the asset does not exist, the ArtifactSaver creates an asset in step 634, adds artifact contents in step 636, and returns the created asset in step 638. In step 640, the WSDLArtifactWriter traverses the returned asset to locate the endpoint asset based on port or qualified name. If the endpoint was not found, the WSDLArtifactWriter creates a new endpoint in step 642. In step 644, the WSDLArtifactWriter then relates the endpoint and service assets.

Although described as a series of steps, these methods do not require the steps to be executed in order or even as part of the same process.

In accordance with a specific embodiment, an introspection framework can store files such as WSDLs, BPELs, and XSDs as artifact assets in a service metadata repository. In order to avoid storing the same artifact file twice, the service metadata repository calculates a fingerprint for an artifact when it is stored. In accordance with an embodiment, this fingerprint can be calculated using Software File Identification technology (SFID) described in pending U.S. patent application Ser. No. 11/106,469 entitled "DATA OBJECT IDENTIFICATION, TRACKING, FILTERING AND MONITORING USING DATA OBJECT FINGERPRINTS," filed Apr. 15, 2005 and incorporated by reference in its entirety. Before submitting a new artifact, a SFID associated with an asset can be compared against existing SFIDs in the repository, to check for duplicates.

The introspector framework attempts to integrate the SOA artifacts to the service metadata repository to support the visibility, impact analysis and reusability use cases. The introspector can publish BPEL, WSDL, XSD, XSLT artifacts to the service metadata repository and capture dependencies between the artifacts for impact analysis. Nested WSDLs and XSDs, abstract Service assets and concrete deployment/Endpoints, and BPEL partnerlink dependencies can be captured and related to Services. Artifact content can be stored in the service metadata repository for reusability while supporting finger printing of artifacts for duplicate detection. Artifacts can be published from nested directories or zip/jar/BPEL suitcase in a transactional fashion.

Figure 7:
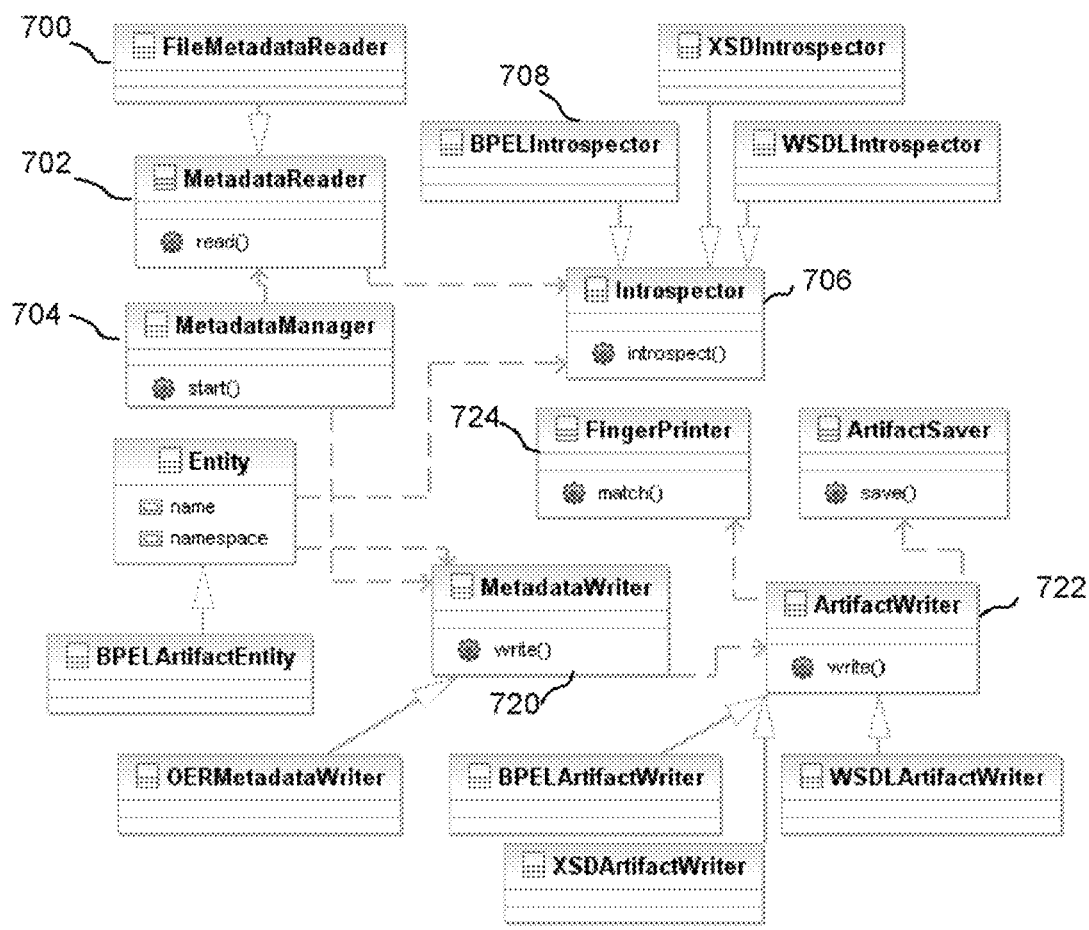
FIG. 7 shows a class diagram, in accordance with an embodiment.
Figure 8:
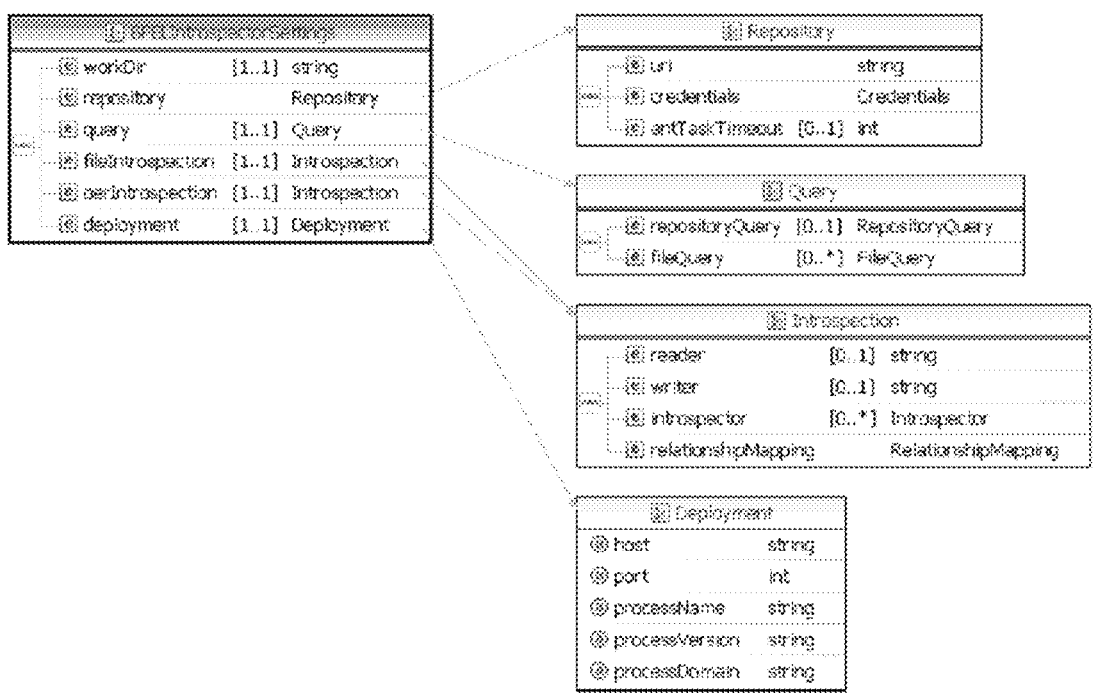
FIG. 8 shows a class diagram, in accordance with an embodiment.
Figure 9:
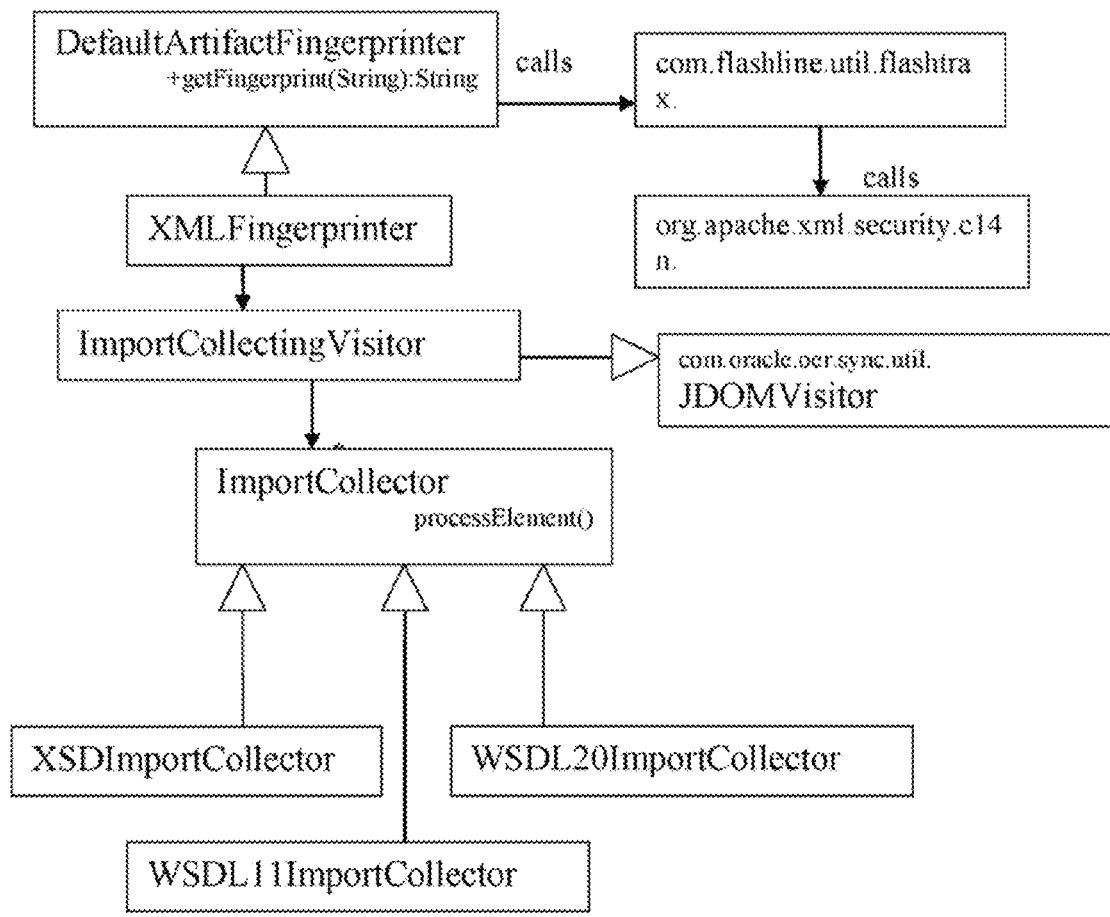
FIG. 9 shows an example of two services, in accordance with an embodiment.
Figure 10:
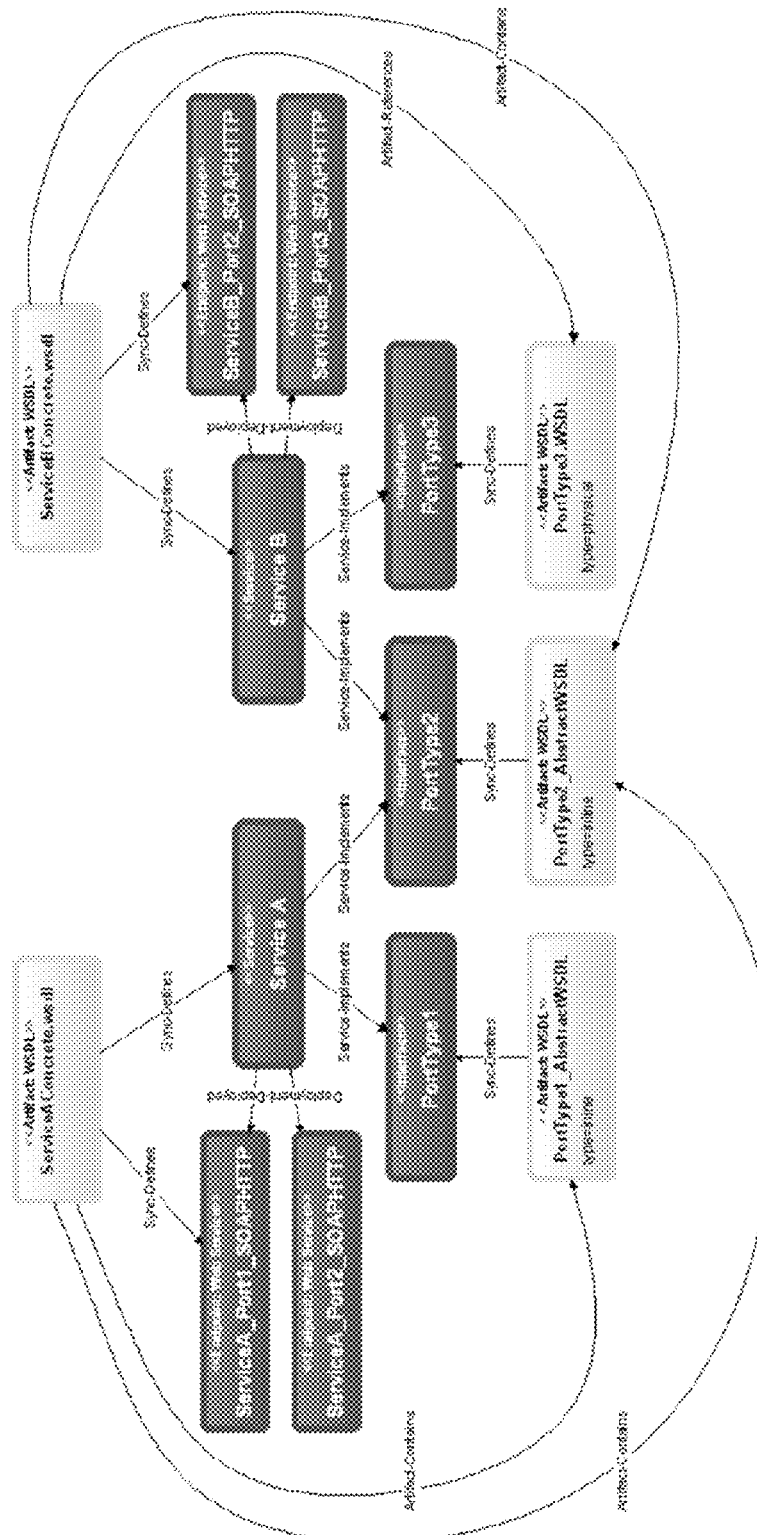
FIG. 10 shows the architecture for a system, in accordance with an embodiment.
Figure 11:
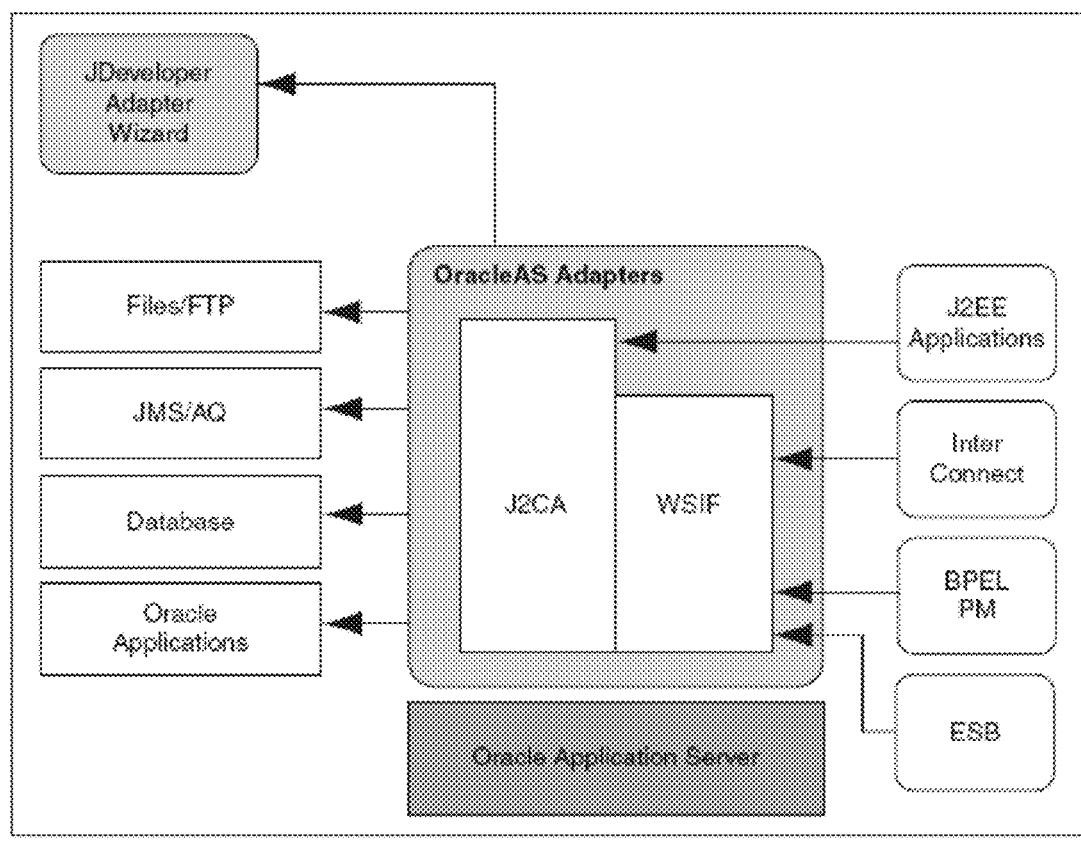
FIG. 11 shows an example of introspecting a file, in accordance with an embodiment.
Figure 12:
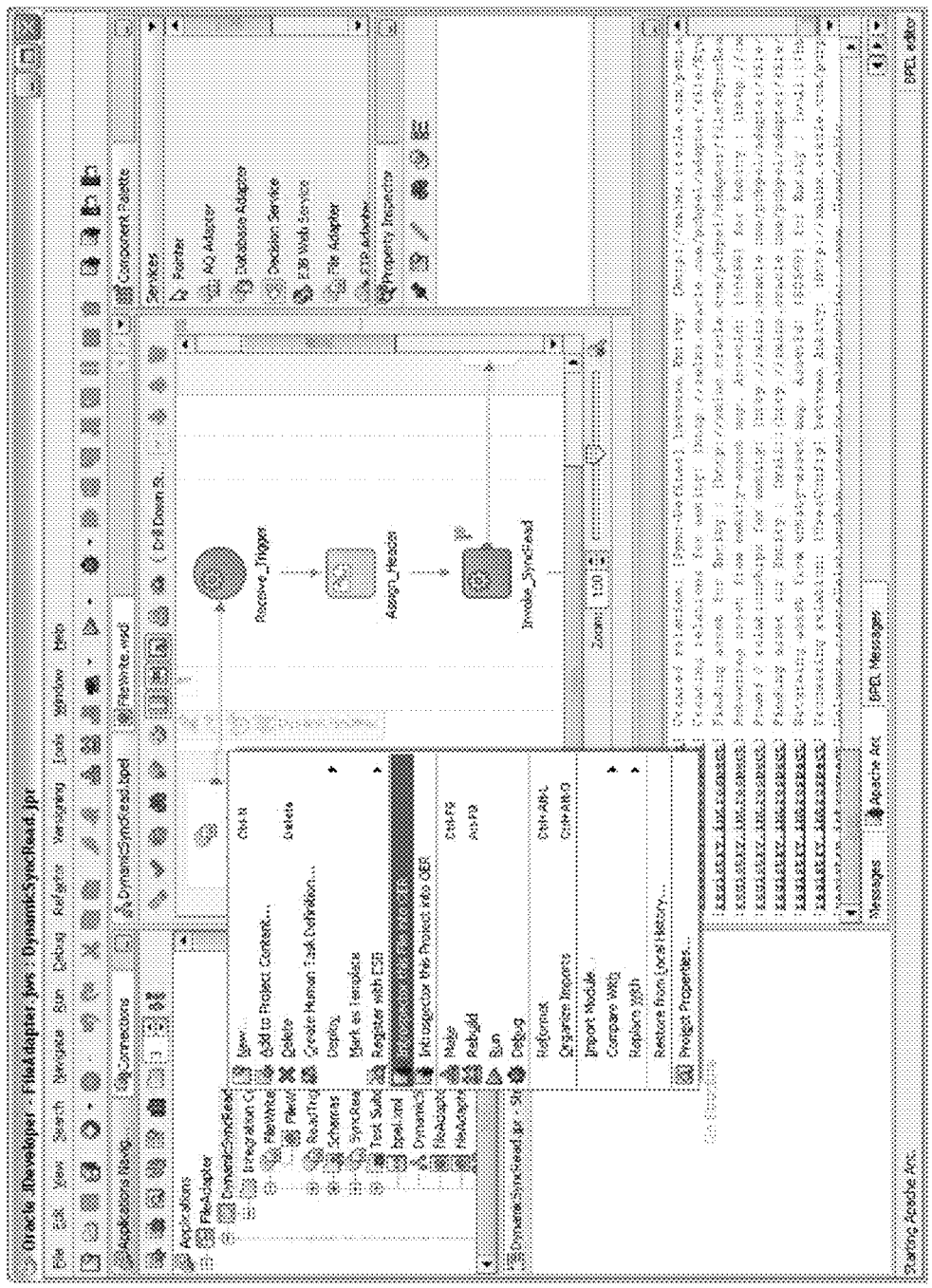
FIG. 12 shows an example service after it has been introspected into the service metadata repository, in accordance with an embodiment.
Figure 13:
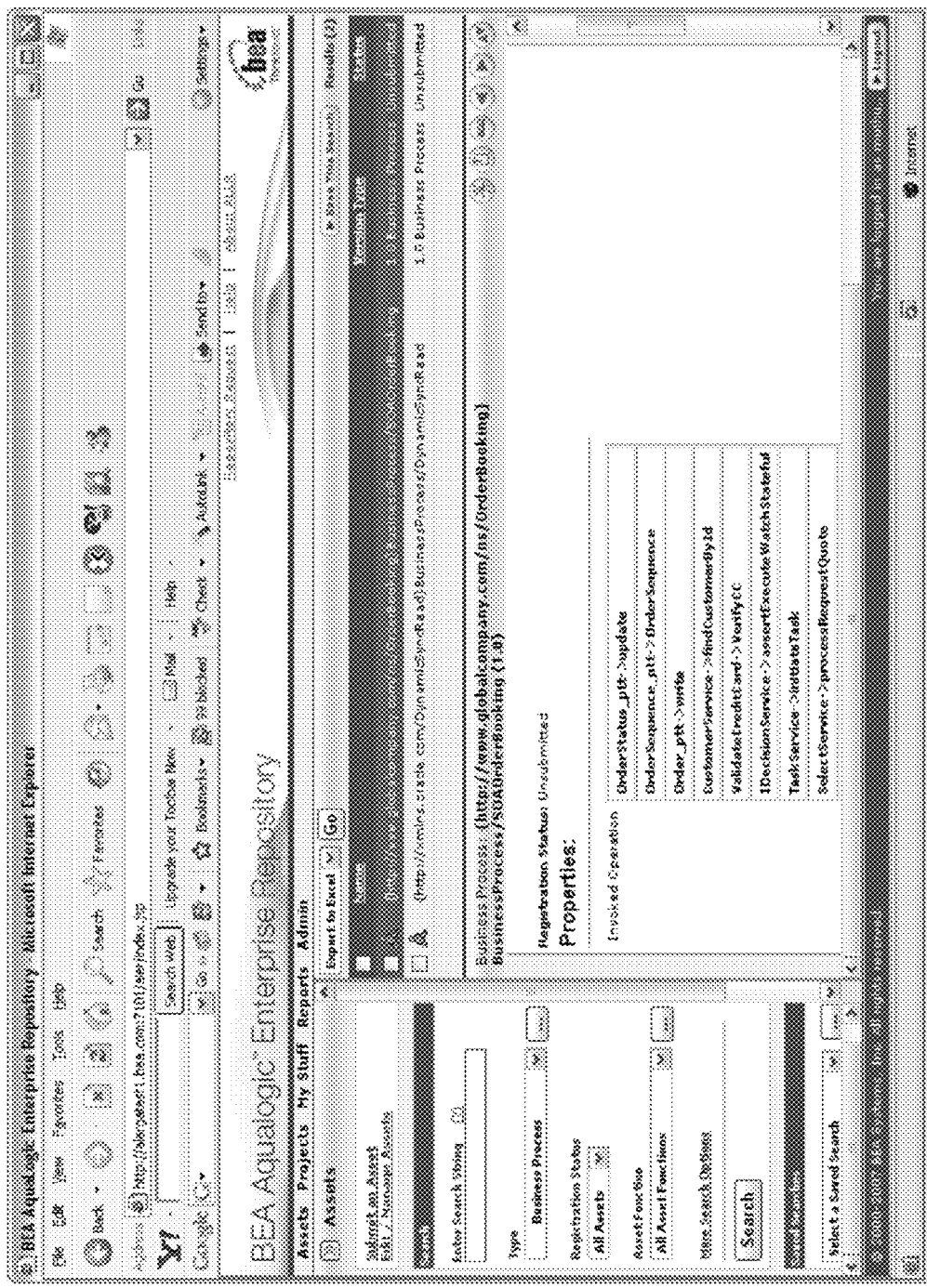
FIG. 13 shows an example adapter after it has been introspected into the service metadata repository, in accordance with an embodiment.
Figure 14:
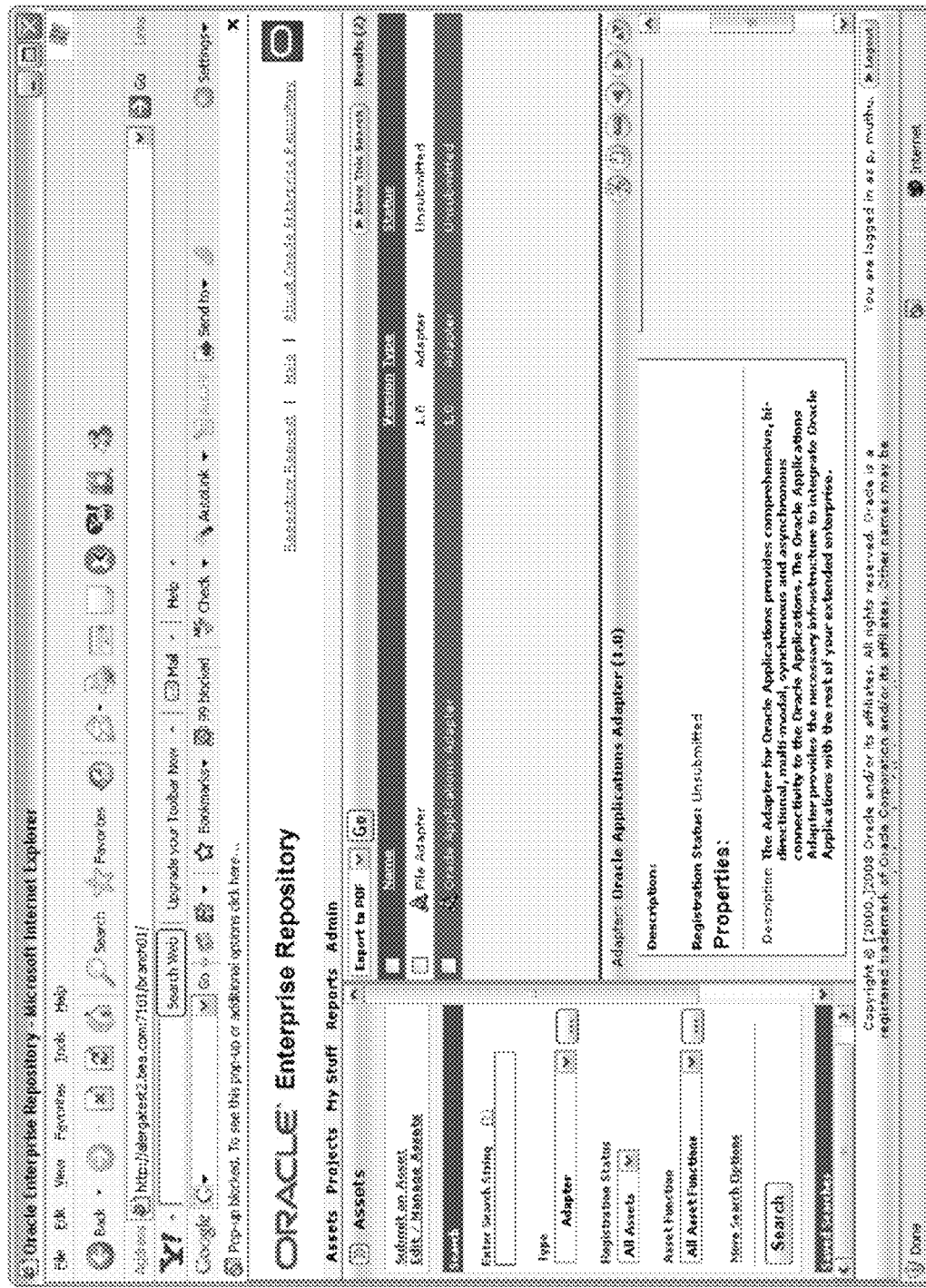
FIG. 14 shows an example, in accordance with an embodiment.
Figure 15:
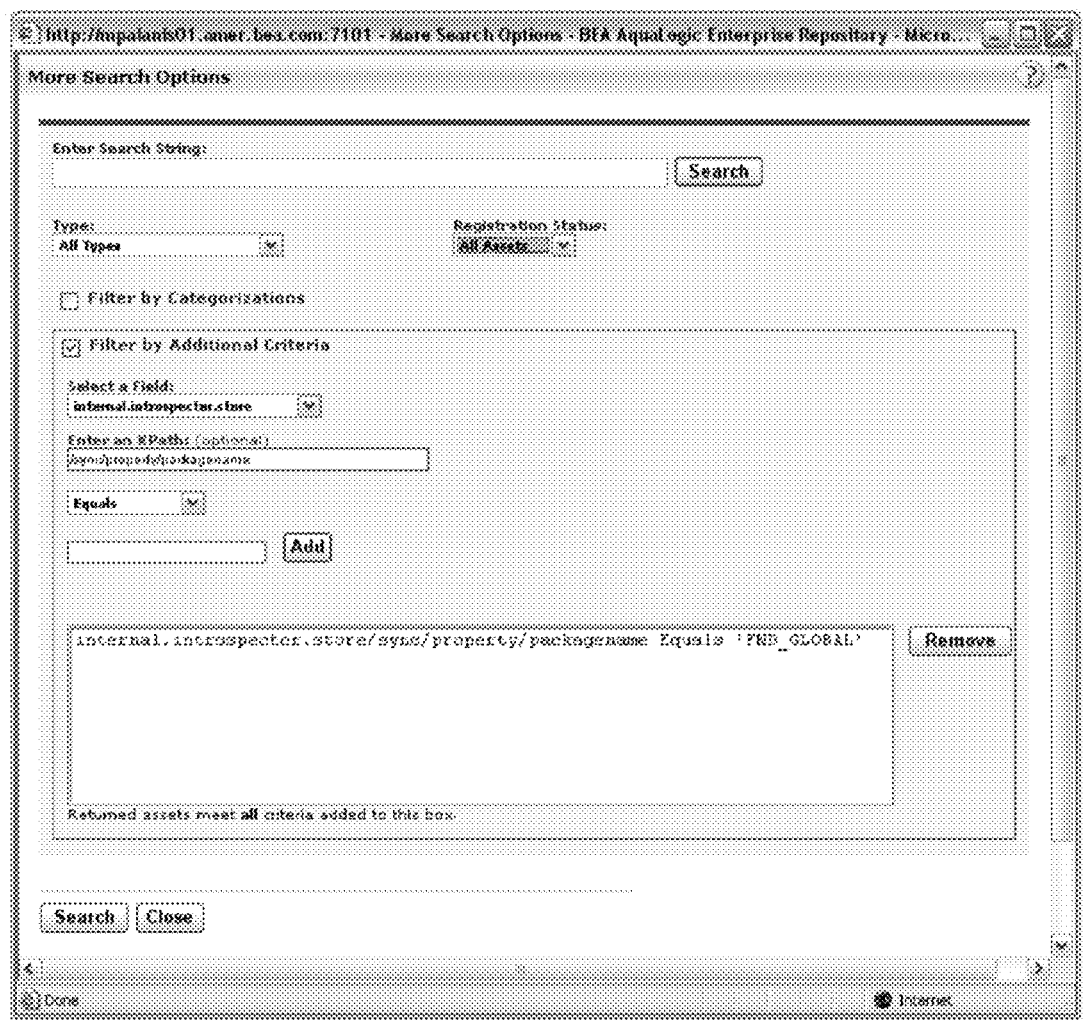
FIG. 15 shows an example, in accordance with an embodiment.
Figure 16:
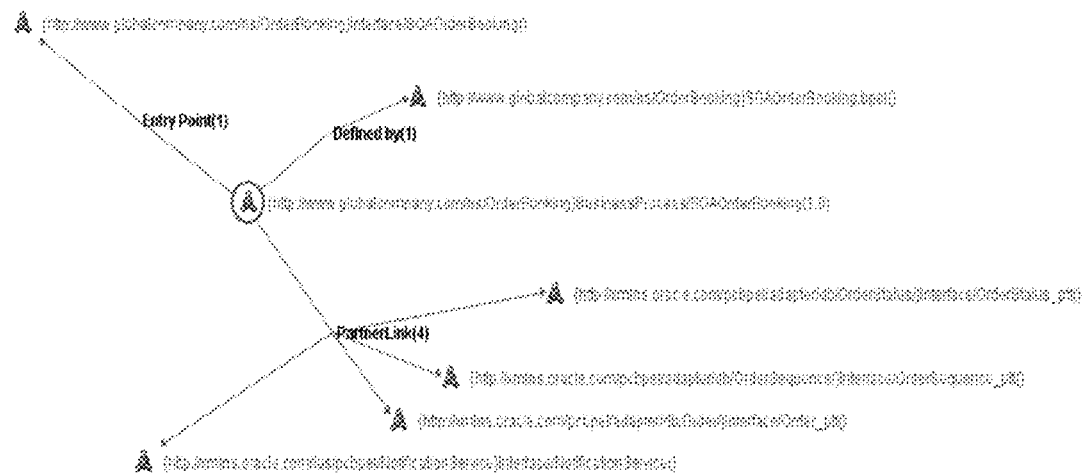
FIG. 16 shows an example, in accordance with an embodiment.
Figure 17:
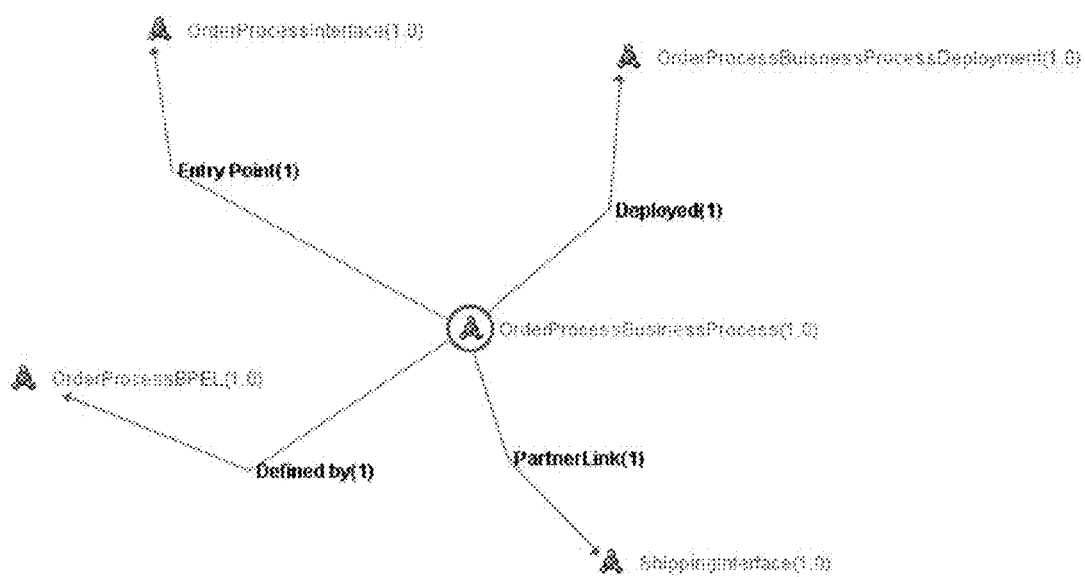
FIG. 17 shows an example, in accordance with an embodiment.
Figure 18:
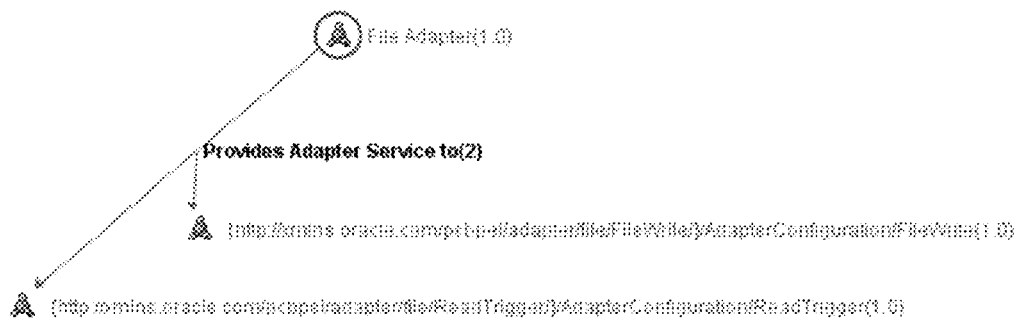
FIG. 18 shows an example, in accordance with an embodiment.
Figure 19:
FIG. 19 shows an example, in accordance with an embodiment.
Figure 20:
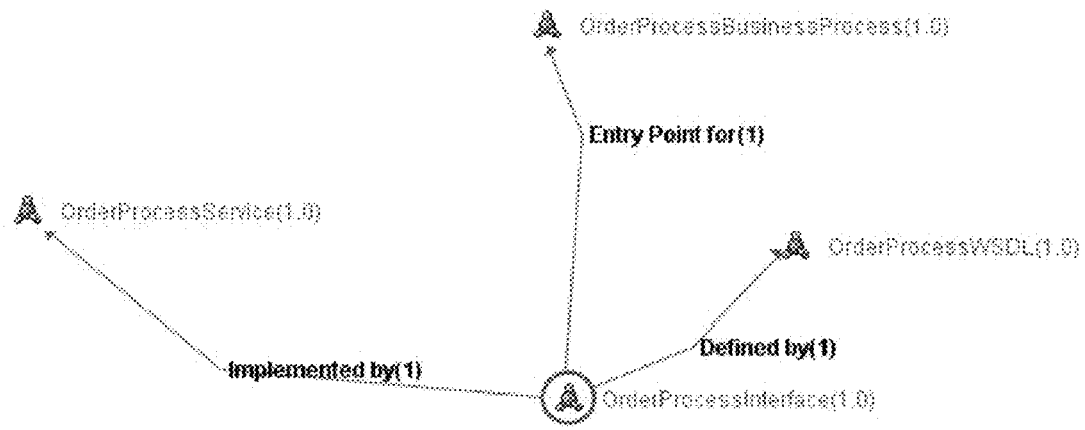
FIG. 20 shows an example, in accordance with an embodiment.
Figure 21:
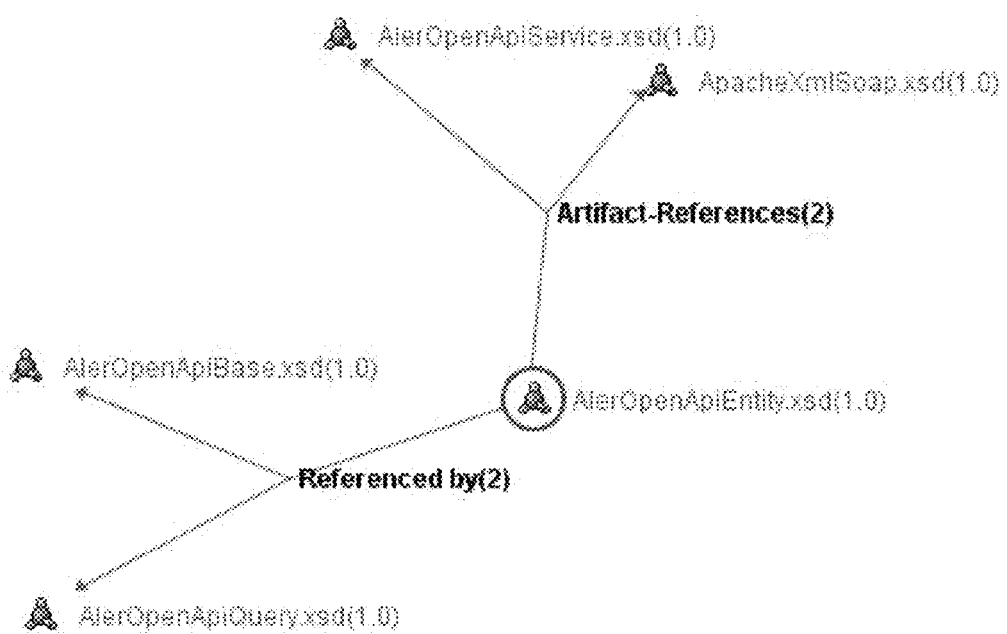
FIG. 21 shows an example, in accordance with an embodiment.

In accordance with a specific embodiment, an introspector framework enabling meta-data to be synchronized between a source and a target is shown in FIG. 7. Target artifacts in a file system are synchronized to a service metadata repository. The framework can provide the following set of services. The framework uses a Metadata Reader 702 to read the source of the artifacts. The framework uses a set of introspectors, one for each artifact type for introspecting the artifacts. BEPLIntrospector 708 for introspecting BPEL; XSDIntrospector for introspecting XSD; and WSDLIntrospector 712. The Framework uses a Metadata Writer for the target where the artifacts will be synchronized. The Framework use a set of Artifact Writers, one for each artifact type for writing to the target. A SOA Canonical model models framework components. Client Components are used for Finger Printing of artifacts, Artifact Storage Handling, and Transactions. The framework further includes a mechanism to start the introspection, such as ANT tasks, command line utility, etc.

The Metadata Manager 704 interface manages the introspector components and acts as an entry point to the introspector executors.

The Config Manager interface manages the configuration needs of all the components such as dynamically loading the Introspectors, Artifact Writers, Repository connection, query, the service metadata repository mapping etc. ANT wrappers also inject configuration information dynamically.

The Metadata Reader 702 interface is responsible for reading the artifacts from the source that provides the Metadata such as File System, Database, etc.

The FileMetadataReader 700 is responsible for picking up every file in a directory, and based on the file extension, calling the associated introspector. If the file is a zip or jar or suitcase, the zip is exploded to a directory. Sub directories are then recursively scanned. Entity objects returned by each introspector are collected into a Hashmap.

The Introspector 706 interface is responsible for introspecting the artifact and returns the canonical representation of the artifact. It may create more than one entity and link up all the created entities but always returns a pointer to the root artifact entity.

The Metadata Writer 720 interface is responsible for iterating all the canonical representation of the artifact collected by the Metadata reader 702 and writing the canonical representations to the target such as the service metadata repository. The Metadata Writer 720 will call write( ) which will make the ArtifactWriter 722 create assets in the service metadata repository. It will addRelationships( ) which will cause the ArtifactWriter 722 to create relationships.

The Artifact Writer 722 is responsible for writing canonical representation of the artifact to targets such as the service metadata repository. The Artifact Writer 722 creates one or more service metadata repository assets. The Artifact Writer 722 can call the FingerPrinter 724 to fingerprint the artifact and detect duplicates using the FingerPrinter 724. It can create relationships between the created assets and other assets.

Service Metadata Repository Client Components: These components are responsible for fingerprinting the artifacts used to detect duplicate assets as well as either saving the artifacts in the service metadata repository or saving a reference to a SCM system.

In accordance with one embodiment, the fingerprinting algorithm is exposed by the service metadata repository's FlashTrax utility, which can be invoked on the client side. The fingerprint it calculates is an MD5 hash. FlashTrax performs some level of canonicalization before calculating the SFID. In particular, if the artifact file is XML, it canonicalizes it using the Canonicalizer class in the Apache XML Security library. This canonicalizes according to the W3C "Canonical XML" standard. This includes canonicalizing the text encoding, line breaks, whitespace, comments, and attribute ordering. It also will do some extra canonicalization not specified in the W3C standard, including normalizing of namespace prefixes.

XML Canonicalization may result in false matches in the following scenarios:

Imports using relative paths: This could happen if two XML documents are the exactly the same, but import other documents by relative paths. These imports could be, for example, XML namespace declarations, XSD <import>s or <include>s, or WSDL <import>s or <include>s. If the relative paths in two documents resolve to files with different contents, the overall meaning of the files will be different. But they will have the same canonical form, and therefore the same fingerprint.

WSDLs with multiple services: There can be two Service assets in the service metadata repository, where each service asset refers to the same WSDL file, but each refers to a different <service> definition within the WSDL file. It's correct to create one Artifact asset for the WSDL. But the Service assets shouldn't be considered identical.

Endpoint URLs: There can be two WSDLs that are exactly the same, except for the URLs in the Endpoints in the WSDLs. These WSDLs could be considered to provide the same "interface", but have different deployment information. In one embodiment, the Introspector may want to only consider the abstract portion (without Endpoints) when matching Services/Interfaces.

WSDL Canonicalization: There can be two WSDLs that are exactly the same, except that some of their elements (for example <portType>s or <message>s) are in different order. These WSDLs could be considered to be semantically equivalent, because they provide the same interface to users. For most of the elements in the wsdl, order is not semantically important.

In order to address these issues, elements from the wsdl namespace are sorted before fingerprinting. The elements are sorted first by their element name, then by their name attribute if present. Most elements in the wsdl namespace have a name attribute, which must have a unique value within the document. If an element does not have a name attribute, it will be maintained in document order, after any other elements with the same element name that do have a name attribute.

Note that sorting by element names won't always result in a schema-valid WSDL. However, that is acceptable because the sorted output is only being used for calculating a fingerprint using software file identification technology (SFID). Extensibility elements from other namespaces (e.g. XSD, wsdl-soap, wsdl-http, wsdl-mime, partnerLink, . . . ) are not sorted. Instead, those elements are maintained in document order, following the sorted elements.

WSDL contains a <documentation> element for user documentation. Because documentation doesn't affect the programmatic interface of the WSDL, documentation elements are removed before fingerprinting.

In accordance with one embodiment, the <types> element is removed before fingerprinting. Note that types may contain XSD, RelaxNG, SchemaTron, or other elements from external namespaces. Reliably canonicalizing these elements from external namespaces presents difficult issues. Note also that the WSDL 2.0 specification (but not the WSDL 1,1 specification) has the notion of a WSDL Component Model. This component model does not contain XSD or other schema elements. The W3C working group has considered the notion of canonicalizing this model. In accordance with an alternative embodiment, the <types> element is left in the document, in its original document order. This may cause miss matches on WSDLs that are identical, but have types in different orders.

In accordance with an embodiment, different element types in the WSDL 1.1 schema can be modified before fingerprinting. Certain elements are removed before fingerprinting. Certain elements are maintained, in document order and moved after elements in the parent that are sorted by the name attribute. Certain elements are maintained, in document order, first by the element name, and then by the value of the name attribute. If the name element is absent for a particular element, it will be maintained in document order (see above).

ArtifactFingerprinter has a method getFingerprint(String): String. The String parameter is the artifact file contents for which to calculate a fingerprint. It returns the fingerprint. In one embodiment, performing canonicalization is delegated to FlashTrax, with no extra logic. In one embodiment, FlashTrax (and the rest of the service metadata repository APIs) assume that artifacts are strings. In accordance with one embodiment, Binary artifacts are assumed to be Base 64 encoded prior to calling the service metadata repository APIs. In one embodiment, the framework performs the Base 64 encoding. In one embodiment, FlashTrax assumes a particular character encoding.

XMLFingerprinter extends ArtifactFingerprinter to perform additional canonicalization. It checks the artifact file to see if it's XML. If so, it calls ImportCollectingVisitor to collect any external files that have been imported, in various technology-dependent ways.

ImportCollectingVisitor extends com.oracle.oer.sync.util-.JDOMVisitor to walk an XML tree, looking for specific elements that import external files. This datatype contains a list of ImportCollectors, wherein each ImportCollector visits a particular type of XML Element. This datatype also contains a map of files that have been found, to avoid duplicate parsing, and infinite loops.

ImportCollector is an Abstract base class, with functionality for visiting a particular type of XML Element and adding it to the results.

XSDImportCollector resolves any XSD <import> or <include> tags, adding the contents of those schemas in-line to the string to be fingerprinted.

WSDL11ImportCollector resolves any WSDL 1.1 <import> tags, adding the contents of those files in-line to the string to be fingerprinted and sorts elements for which order isn't semantically important.

WSDL20ImportCollector resolves any WSDL 2.0 <import> or <include> tags, adding the contents of those files in-line to the string to be fingerprinted and sorts elements for which order isn't semantically important.

The Introspection framework will call ArtifactFingerprinter to compute the SFID, before calling ArtifactSaver. ArtifactFingerprinter does not directly address issue of how the Introspection Framework will check Services, and other non-artifact assets, to see if they're duplicates. BPEL 2.0 has imports, but BPEL 1.1 does not. One embodiment includes inlining schemas that are referred to by XML Namespace imports. Such schemas could be used to define elements that are referred to by QName, for example in WSDL. However, this leads to problems regarding how these namespaces should be resolved. The XML specification leaves namespace resolution to the parser. One possibility would be to parse a list of files/directories that contain XML files to match, based on namespace. An alternative option would be to look up the namespace URIs on the internet. Both of these alternatives can be inefficient. Some of the specifications (e.g. WSDL 2.0) require that other files be imported for Qualified Names (QNames) to be used. In one embodiment, there is no attempt to resolve namespace urls.

The Introspection Framework uses an ArtifactSaver to store files such as WSDLs, BPELs, and XSDs as artifact assets in the service metadata repository.

The service metadata repository client component creates and updates artifacts which can be used by the Introspection Framework. The service metadata repository client component supports saving Artifact information on new Artifact Assets after the Introspector framework creates the Artifact Assets, and passes them to the ArtifactSaver to add additional information. The service metadata repository client component calculates and stores the URL of the Artifact Asset, thereby permitting users to download the contents, via the consumption framework. This URL could point to an SCM or external HTTP server, rr in the case when the content is stored in the service metadata repository, it will point to the service metadata repository Servlet that makes the content available. The service metadata repository client component supports "References Artifacts," whose contents are stored in an SCM or on an external HTTP server. The service metadata repository client component also updates the FileInfo and SFID on the Artifact asset.

ArtifactSaver design: ArtifactSaver will perform the operations mentioned in the previous section. It will call the service metadata repository REX API (via class FlashlineRegistry), to save, update, and check for duplicate Assets). When saving a "Stored Artifact", the artifact methods will take the File containing the new artifact. The service metadata repository APIs assume that artifacts are strings. Binary artifacts are assumed to be Base 64 encoded prior to calling the service metadata repository APIs. In accordance with one embodiment, the Introspector framework performs the Base 64 encoding. In accordance with one embodiment, the Introspector framework supports binary files.

When saving a "Referenced Artifact," the artifact methods will take the id of the ArtifactStore that has information about the SCM, and a String path relative to that SCM.

BPEL process manager and enterprise service buses connect to Adapters to integrate backend packaged applications with the process flow by invoking Web services using JCA and SOAP bindings. Introspector attempts to introspect the Metadata in the WSDL and detect the Adapters integration. This will result in Adapter entities with information harvested from the Metadata linked to the Service entities categorized by the type of Adapter.

This will help in the following use cases: Dependency and impact analysis of which Adapter is used by which service. Query which instance of Adapter is used by which Service. Queries based on various properties such as Adapter Object type and find the dependencies. Visibility of how a Service invoked by a BPEL Process is implemented. In accordance with one embodiment, adapters integrate Oracle Application Server and other systems with transport protocols, data stores, and messaging middleware. Amongst many other adapters, these adapters include OracleAS Adapter for FTP, OracleAS Adapter for JMS, OracleAS Adapter for Databases, OracleAS Adapter for Advanced Queuing, OracleAS Adapter for Files, and OracleAS Adapter for MQ Series.

In accordance with one embodiment, the adapters are based on J2EE Connector Architecture (J2CA) 1.5 standards and deployed as a resource adapter.

In accordance with one embodiment, during design time, the adapters use an integrated development environment to generate the adapter metadata. The request-response service, also known as J2CA outbound interaction, and the event-notification service, also known as J2CA inbound interaction, are described in J2CA, WSIF, and WSDL files. These WSDL files consist of J2CA extension elements. The J2CA WSDL elements are used by the Adapter framework to seamlessly integrate the J2CA 1.5 resource adapter with a BPEL Process Manager.

In accordance with one embodiment, packaged-application adapters can be deployed as J2EE Connector Architecture (J2CA) 1.5 resource adapters or as Web service servlets. In addition to a J2CA interface, packaged-application adapters can support the Web Service Definition Language (WSDL) and Simple Object Access Protocol (SOAP) interface.

In accordance with one embodiment, Application Explorer is a Java swing-based design-time tool for configuring packaged-application adapters. Using Application Explorer, back-end application connections can be configured. Furthermore, back-end application schemas can be browsed and exposed as adapter services.

Adapter Introspection

Adapter dependencies are detected through the WSDL. There are 2 usage patterns detected based on how the Adapters are architected.

The first usage pattern is detected when Oracle SOA Suite components such as Oracle BPEL PM use JCA binding to connect to the Adapters. All the technology adapters and legacy adapters use JCA standard to integrate with the SOA suite as shown in the architecture.

The second usage pattern is detected when Oracle SOA Suite components such as Oracle BPEL PM use SOAP binding to connect to the adapters. Since SOAP binding is the standard binding used by the vanilla web services, the namespaces used by the Adapters can be used to detect the pattern.

When a WSDL is introspected, JCA extensions are detected by the WSDL introspector plug-in. It uses an algorithm to map to an adapter based on certain properties in the JCA bindings section of the WSDL.

One embodiment includes the following properties: ActivationSpec [a Web Service Invocation Framework (WSIF) class implemented to handle input triggers] and InteractionSpec [a WSIF class implemented to handle outbound requests]. These properties point to an adapter based on the value of the property. A single adapter can have various Activationspec and InteractionSpec based on the patterns.

Once the Adapter is detected, it looks upon a configured Adapter section and if the entity is not created in the service metadata repository, it will create the Adapter entity and link the dependencies. FIG. 22 shows a configuration for the File Adapter.

When a WSDL is introspected, certain configured Namespaces are detected by the WSDL introspector plug-in. It uses an algorithm to map to an adapter based on the target Namespace of the WSDL. Multiple Namespaces can be configured for a given Adapter. FIG. 23 shows an example.

Model

The Metadata that need to be stored in the service metadata repository includes adapters and adapter binding or configuration. Adapter metadata provides information about the Adapter itself whether it's a Technology adapter or Packaged application adapter. It provides information about what the adapter does, where it's utilized and what are the advantages of the adapter. This information will be one per adapter and will not have any instance specific data. Adapter Binding or Configuration metadata provides information about where the Adapter is hosted/running/installed so that a connection can be established. It also provides information about what subset of Adapter service is utilized. I.e.) PL/SQL or other objects etc Since Adapter Binding properties are several and it would be inefficient to look for all of them in a typed fashion, all these JCA extended properties should be picked as name/value pairs and stored in the service metadata repository CMF (extended Metadata) as properties in the Adapter Configuration asset. These properties can be queried using an XPath like syntax.

Multiple Services can connect to the same Adapter instance using the same binding or different binding with subtle variations. For example, the File Adapter instance can be configured to poll for different directories and trigger a BPEL process. In accordance with one embodiment, one JCA binding will correspond to one Adapter instance, but may not correlate or rendezvous on the same Adapter Configuration. Instead, for every JCA binding, an Adapter Configuration will be created even though a simple algorithm can detect matching Adapter Configuration. However within the same Service QName/Interface, the Adapter Configuration will be correlated. An Adapter Configuration could be described as an Adapter Endpoint or Adapter Binding since this is really a WSDL port with a JCA binding.

When a XSD is introspected, XSD metadata becomes an 'Artifact: XSD' asset in the service metadata repository. Imported XSDs from parent XSDs become other 'Artifact: XSD' assets and related using relationship 'Artifact-References' in the service metadata repository. The asset has information pointing to a HTTP URL to retrieve the XSD.

Introspect WSDL. Abstract WSDL (WSDL1.1) When an abstract WSDL is introspected, it should result in the following actions in the service metadata repository: Interface: Web Service asset will be created. 'Artifact: WSDL' asset will be created that will contain the WSDL contents. Artifact:WSDL is related to Interface: Web Service asset using the relationship 'Sync-Defines'. Imported WSDLs become other 'Artifact: WSDL' assets and related using relationship 'Artifact-References'. Imported XSDs in the WSDL become 'Artifact: XSD' assets and related to 'Artifact: WSDL' using relationship 'Artifact-References'. Further including all the actions described above for introspecting XSD. 'Artifact: WSDL' asset FileInfo field points to a HTTP URL (which is an internal URL pointing to the service metadata repository) to retrieve the WSDL. WSDL Summary is added to the Service asset. WSDL Summary is an extended metadata that is put in the CMF. By enabling a hidden property, this extended metadata can be shown in the Web console UI.

When a concrete WSDL (WSDL1.1) is introspected, it should result in the following actions in the service metadata repository. All the actions above as per introspecting WSDL. Service Asset (comes with the service metadata repository base pack) will be created. 'Interface: Web Service' asset is related to 'Service' asset by the relationship 'InterfaceOf'.

'Endpoint: Webservice' (comes with the service metadata repository base pack) asset will be created that will contain the 'endpointURI.' Service asset (comes with the service metadata repository base pack) is related to Endpoint using the relationship 'deployed.' WSDL Summary is added to the Service asset (comes with the service metadata repository base pack). WSDL Summary is an extended metadata that is put in the CMF. By enabling a hidden property, this extended metadata can be shown in the Web console user interface.

Inlined XSD in a WSDL. In one embodiment, when an abstract or concrete WSDL is introspected and if it contains one or more inlined XSDs, it should result in the following actions in the service metadata repository. Further including all actions above as per Concrete WSDL. Each inline XSD will become a separate 'Artifact: XSD' asset. All action as per Instrospecting XSD except the parent and child XSDs are related using the relationship 'Artifact-Contains'. The above behavior may be turned OFF if the user doesn't like it.

Introspect XSL. When a XSL is introspected, it should result in the following actions in the service metadata repository. XSLs become 'Artifact: XSLT' assets. Referenced XSDs in the XSLTs create relationships to 'Artifact:XSD' assets. All the actions as per Introspect WSDL. Artifact: XSLT' asset FileInfo field points to a HTTP URL (which is an internal URL pointing to the service metadata repository) to retrieve the XSL.

Introspect BPEL (BPEL1.1). When a BPEL is introspected, it should result in the following actions in the service metadata repository. 'Business Process' asset will be created. 'Artifact: BPEL' asset will be created that will contain the BPEL contents. Business Process asset is related to Artifact: BPEL asset using the relationship 'Sync-Defines'. An Interface: Web Service asset is created for the entryPoint of the Business Process. Business Process asset is related to Interface: Web Service asset using the relationship 'entryPoint'. All the actions as per introspect WSDL for the WSDL that corresponds to the above Service. For every partnerLink used by the BPEL, following actions result Interface: Web Service Asset (comes with the service metadata repository base pack) for each dependency. Business Process asset is related to Interface: Web Service asset using the relationship 'partnerLink'. All the actions as per Introspect WSDL for the WSDL that corresponds to the above Service. 'Artifact: BPEL' asset FileInfo field points to a HTTP URL (which is an internal URL pointing to the service metadata repository) to retrieve the BPEL. If a transformation is done in a BPEL, it creates a 'Artifact: XSLT' asset and the 'Artifact:BPEL' asset is related to the 'Artifact: XSLT' using the relationship 'Artifact-References.' Introspect concrete BPEL details from build.properties to capture the Deployment info and create Deployment asset. Relate the Business Process asset to Deployment asset using the relationship 'deployed'. Also, relate the Deployment asset to Endpoint assets to capture the 'realizedEntrypoint' and 'realizedPartnerLinks' relationship.

Introspect Suitcases/Zip/Jar. If one of the file introspected is an archive, it should be unzipped and recursively introspected for the artifacts that are configured.

Artifact Assets. When assets are created to represent artifacts such as 'Artifact:WSDL', 'Artifact:XSD' etc, the name of the asset should be named using the scheme <Namespace from the Artifact>/<filename>. For example, http://mycompany.com/customer/cust.xsd.

User supplied Namespace. Users can supply a namespace in the configuration when the introspection is started. The scope of the namespace is that it applies to ONLY the non artifact asset and not to artifact based assets. This is the default naming scheme. For example, SOAProjects/ESB/Service/Customer. Here, SOAProjects/ESB is the user supplied namespace that is added to all the non artifact assets.

Non Artifact Assets. When assets are created to represent non artifacts assets such as 'Service', 'Business Process' etc, the name of the asset should be named using the user supplied namespace. See U2.2. If one is not supplied, then it should use the scheme <Namespace from the Artifact>/<Type>/<Local Name>. For example http://mycompany.com/customer/Service/Customer. The local name will be derived depending on the entity. For example, the Service will get its local name from <Service> element in the WSDL if found, if not, from the portType. For the Business Process, the local name gets its name from the process name inside the BPEL.

Naming Conflicts. When assets are created to represent Artifacts and non artifacts assets, there may be name collisions. In those scenarios, the following approach is used: The Naming algorithm will retrieve all the assets from the service metadata repository that starts with the name of the asset having the conflicts. It will then pick the last one in list and increase the last digit [Note that that this is consistent with what is already done], for example, if {http://xmlns.oracle.com/pcbpel/adapter/file/FileWrite/}FileWrite.wsdl is already taken, it will name the new asset like {http://xmlns.oracle.com/pcbpel/adapter/file/FileWrite/}FileWrite.wsdl-2. If that slot was taken, then it will name the new asset as {http://xmlns.oracle.com/pcbpel/adapter/file/ FileWrite/}FileWrite.wsdl-3.

Name size limit. When the size of the name of an asset being created is greater than 127 chars, it will be truncated to have only the first 127 chars.

Exact match. A WSDL artifact is introspected to the service metadata repository which results in a 'Artifact:WSDU' asset. The same artifact is republished again with no change. This should not result in duplicate assets.

General XML Canonicalization. The Finger printing should ignore XML comments, white spaces and attribute order.

Namespace prefixes differs. A WSDL artifact is introspected to the service metadata repository which results in a 'Artifact: WSDL' asset. An artifact with a canonical match is published with just the Namespace prefixes differing. For example a namespace can be declared using the prefix "nsl" in one artifact like xmlns:ns1=http://www.bea.com/oer/integration/config/bpel and in another using the prefix "pfx1" like xmlns:pfx1=http://www.bea.com/oer/integration/config/ bpel. In one embodiment, this does not result in duplicate assets.

Imported Nested schemas. The Finger Printing algorithm should inline all the imported schemas before calculating the Finger Print. Cases to be considered are XSD imports, XSD includes, WSDL imports etc. This also should handle the case where two XSDs or WSDLs that are identical but have relative imports/includes that resolve to different files.

The contents of the artifacts such as WSDL, XSD etc are stored in the service metadata repository in CMF and can be downloaded using HTTP link which is populated in the FileInfo field. The actual content is retrieved from the asset's CMF using a HTTP link that points to an internal the service metadata repository URL that is populated during the introspection process.

Coarse Grained Transactions: The only granularity of transactions that the introspector supports is a transaction started at the beginning of the introspection and committed in the end. In the case of bulk loading use cases with multiple suitcases etc, the introspection need to be started in a loop using ANT tasks. The user needs to write a custom script if a transaction at the project level needs to be supported. When a transaction is rolled back, a notification can be sent to the registrar to any configured user.

Introspector executors: the introspection framework should provide ANT tasks to start the introspection using which complex ANT scripts can be written. These tasks should be tested within the JDeveloper environment with integration to existing build scripts. By default the introspection framework will ship with a *.bat and *.sh file to start the introspection via a command line utility. This will use a configuration file for complex configuration and use command line parameters for simple things.

Adapters. When a BPEL is introspected with Adapter extensions, it should result in the following action: An Adapter asset will be created. This adapter asset will have more Metadata about the type of the adapter and what it does etc. The name of the Adapter asset will be named after the adapter. An Adapter Configuration asset will be created that will contain the binding and connectivity information used by a specific service. The Adapter Configuration asset will be related to the Service asset that is using the adapter configuration.

Embodiments can include a computer readable medium, such as a computer readable storage medium. The computer readable storage medium can have stored instructions which can be used to program a computer to perform any of the features present herein. The storage medium can include, but is not limited to, any type of disk including floppy disks, optical discs, DVD, CD-ROMs, micro drive, and magneto-optical disks, ROMs, RAMs, EPROMs, EEPROMs, DRAMs, flash memory or any media or device suitable for storing instructions and/or data. The present invention can include software for controlling the hardware of a computer, such as a general purpose/specialized computer(s) or a microprocessor(s), and for enabling them to interact with a human user or other mechanism utilizing the results of the present invention. Such software may include, but is not limited to, device drivers, operating systems, virtual machines, virtual operating systems, execution environments/containers, and user applications.

Embodiments can include providing code for implementing processes. The providing can include providing code to a user in any manner. For example, the providing can include providing the code on a physical media to a user; or any other method of making the code available.

Embodiments can include a computer-implemented method for transmitting the code which can be executed at a computer or a virtual machine to perform any of the processes of embodiments. The transmitting can include transfer through any portion of a network, such as the Internet; through wires; or any other type of transmission. The transmitting can include initiating a transmission of code; or causing the code to pass into any region or country from another region or country. A transmission to a user can include any transmission received by the user in any region or country, regardless of the location from which the transmission is sent.

The foregoing description of embodiments has been provided for the purposes of illustration and description. It is not intended to be exhaustive or to limit the invention to the precise forms disclosed. Many modifications and variations will be apparent to one of ordinary skill in the relevant arts. For example, steps preformed in the embodiments of the invention disclosed can be performed in alternate orders, certain steps can be omitted, and additional steps can be added. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the claims and their equivalents.

What is claimed is:

1. A method comprising:
receiving a source artifact from a process, wherein the source artifact is one of a Web Service Definition Language (WSDL) format file, a Business Process Execution Language (BPEL) format file, an XML Schema Definition (XSD) format file, and an Extensible Stylesheet Language Transformation (XLST) format file;
introspecting said source artifact to identify a plurality of service metadata artifact entities based on a model of the format of said source artifact;
processing a first service metadata artifact entity of said plurality of service metadata artifact entities to generate a processed service metadata artifact entity, wherein said processing includes canonicalizing said first service metadata artifact entity; wherein said processed service metadata artifact entity is not required to be schema-valid;
applying a hashing function to said processed service metadata artifact entity to generate a fingerprint of said processed service metadata artifact entity;
searching a service metadata repository, using said fingerprint of said processed service metadata artifact entity, to identify a preexisting service metadata asset having a fingerprint attribute matching said fingerprint of said processed service metadata artifact entity;
if the fingerprint of said processed service metadata artifact entity matches a fingerprint attribute of a preexisting service metadata asset in the service metadata repository, returning to said process a service metadata repository reference to said matching preexisting service metadata asset;
if the fingerprint of said processed service metadata artifact entity does not match a fingerprint attribute of a preexisting service metadata asset in the service metadata repository, storing said first service metadata artifact entity in said service metadata repository as a new service metadata asset, storing said fingerprint of said processed service metadata artifact entity as an attribute of said new service metadata asset, and returning to said process a service metadata repository reference to said new service metadata asset.

2. The method of claim 1, wherein said processing step comprises sorting elements of said first service metadata artifact entity.

3. The method of claim 1, wherein said processing step comprises:
sorting elements of said first service metadata artifact entity; and
wherein elements having a name attribute are sorted in name order.

4. The method of claim 1, wherein said processing step comprises:
sorting elements of said first service metadata artifact entity;
wherein elements having a name attribute are sorted in name order; and
wherein elements not having a name attribute are maintained in document order.

5. The method of claim 1, wherein said processing step comprises removing documentation elements from said first service metadata artifact entity.

6. The method of claim 1, wherein said processing step comprises removing types elements from said first service metadata artifact entity.

7. The method of claim 1, wherein said source artifact is a Web Service Definition Language (WSDL) format file.

8. The method of claim 1, wherein said source artifact is a Business Process Execution Language (BPEL) format file.

9. The method of claim 1, wherein said source artifact comprises an adapter.

10. The method of claim 1, wherein said source artifact comprises a transformation.

11. A system comprising:
one or more microprocessors;
a metadata manager operating on said one or more microprocessors which receives a source artifact from a process, wherein the source artifact is one of a Web Service Definition Language (WSDL) format file, a Business Process Execution Language (BPEL) format file, an XML Schema Definition (XSD) format file, and an Extensible Stylesheet Language Transformation (XLST) format file;
an introspector which introspects said source artifact to identify a plurality of service metadata artifact entities based on a model of the format of said source artifact;
a metadata writer which processes a first service metadata artifact entity of said plurality of service metadata artifact entities to generate a processed service metadata artifact entity wherein said processing includes canonicalizing said first service metadata artifact entity, and wherein said processed service metadata artifact entity is not required to be schema-valid;
a service metadata repository client component of a service metadata repository which,
applies a hashing function to said processed service metadata artifact entity to generate a fingerprint of said processed service metadata artifact entity,
searches said service metadata repository, using said fingerprint of said processed service metadata artifact entity, to identify a preexisting service metadata asset having a fingerprint attribute matching said fingerprint of said processed service metadata artifact entity,
if the fingerprint of said processed service metadata artifact entity matches a fingerprint attribute of a preexisting service metadata asset in said service metadata repository, returns to said process a service metadata repository reference to said matching preexisting service metadata asset, and
if the fingerprint of said processed service metadata artifact entity does not match a fingerprint attribute of a preexisting service metadata asset in the service metadata repository, stores said first service metadata artifact entity in said service metadata repository as a new service metadata asset, stores said fingerprint of said processed service metadata artifact entity as an attribute of said new service metadata asset, and returns to said process a service metadata repository reference to said new service metadata asset.

12. The system of claim 11, wherein processing said first service metadata artifact entity to generate said processed service metadata artifact entity comprises sorting elements of said first service metadata artifact entity.

13. The system of claim 11, wherein processing said first service metadata artifact entity to generate said processed service metadata artifact entity comprises:
sorting elements of said first service metadata artifact entity; and
wherein elements having a name attribute are sorted in name order.

14. The system of claim 11, wherein processing said first service metadata artifact entity to generate said processed service metadata artifact entity comprises:
sorting elements of said first service metadata artifact entity;
wherein elements having a name attribute are sorted in name order; and
wherein elements not having a name attribute are maintained in document order.

15. The system of claim 11, wherein processing said first service metadata artifact entity to generate said processed service metadata artifact entity comprises removing documentation elements from said first service metadata artifact entity.

16. The system of claim 11, wherein processing said first service metadata artifact entity to generate said processed service metadata artifact entity comprises removing types elements from said first service metadata artifact entity.

17. The system of claim 11, wherein said source artifact comprises a Web Service Definition Language (WSDL) format file.

18. The method of claim 11, wherein said source artifact comprises a Business Process Execution Language (BPEL) format file.

19. The method of claim 11, wherein said source artifact comprises an adapter.

20. A non-transitory computer-readable storage medium, including instructions stored thereon which when read and executed by a computer cause the computer to perform steps comprising:
receiving a source artifact from a process, wherein the source artifact is one of a Web Service Definition Language (WSDL) format file, a Business Process Execution Language (BPEL) format file, an XML Schema Definition (XSD) format file, and an Extensible Stylesheet Language Transformation (XLST) format file;
introspecting said source artifact to identify a plurality of service metadata artifact entities based on a model of the format of said source artifact;
processing a first service metadata artifact entity of said plurality of service metadata artifact entities to generate a processed service metadata artifact entity, wherein said processing includes canonicalizing said first service metadata artifact entity; wherein said processed service metadata artifact entity is not required to be schema-valid;
applying a hashing function to said processed service metadata artifact entity to generate a fingerprint of said processed service metadata artifact entity;
searching a service metadata repository, using said fingerprint of said processed service metadata artifact entity, to identify a preexisting service metadata asset having a fingerprint attribute matching said fingerprint of said processed service metadata artifact entity;
if the fingerprint of said processed service metadata artifact entity matches a fingerprint attribute of a preexisting service metadata asset in the service metadata repository, returning to said process a service metadata repository reference to said matching preexisting service metadata asset;
if the fingerprint of said processed service metadata artifact entity does not match a fingerprint attribute of a preexisting service metadata asset in the service metadata repository, storing said first service metadata artifact entity in said service metadata repository as a new service metadata asset, storing said fingerprint of said processed service metadata artifact entity as an attribute of said new service metadata asset, and returning to said process a service metadata repository reference to said new service metadata asset.

* * * * *